(12) United States Patent
Gholmieh

(10) Patent No.: US 8,607,279 B2
(45) Date of Patent: Dec. 10, 2013

(54) INDUCED SLEEP INTERVALS FOR DEVICES RECEIVING BURSTY NON-REAL TIME BROADCAST FLOWS

(75) Inventor: Ralph A. Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 12/729,834

(22) Filed: Mar. 23, 2010

(65) Prior Publication Data

US 2011/0239256 A1    Sep. 29, 2011

(51) Int. Cl.
*H04B 1/38* (2006.01)
*H04B 1/40* (2006.01)
*H04N 7/16* (2011.01)

(52) U.S. Cl.
USPC ............ 725/62; 725/143; 725/146; 455/73; 455/88; 455/574

(58) Field of Classification Search
USPC ....................................................... 725/100
See application file for complete search history.

(56) References Cited

U.S. PATENT DOCUMENTS

| | | | |
|---|---|---|---|
| 2005/0100037 A1 | 5/2005 | Burbidge et al. | |
| 2006/0075446 A1* | 4/2006 | Klemets et al. | 725/100 |
| 2006/0258410 A1* | 11/2006 | Collins et al. | 455/574 |
| 2006/0291386 A1 | 12/2006 | Jyske et al. | |
| 2007/0168535 A1* | 7/2007 | Ikonen et al. | 709/230 |
| 2008/0020768 A1* | 1/2008 | Li et al. | 455/436 |
| 2008/0234012 A1* | 9/2008 | Liu et al. | 455/574 |
| 2009/0083783 A1* | 3/2009 | Park et al. | 725/25 |
| 2009/0092174 A1* | 4/2009 | Wang | 375/132 |
| 2009/0307368 A1* | 12/2009 | Sriram et al. | 709/231 |
| 2010/0103880 A1* | 4/2010 | Fu | 370/328 |
| 2010/0158021 A1* | 6/2010 | Kliger et al. | 370/400 |
| 2010/0241880 A1* | 9/2010 | Wertheimer et al. | 713/310 |

FOREIGN PATENT DOCUMENTS

WO    WO2006099149    9/2006

OTHER PUBLICATIONS

International Search Report and Written Opinion—PCT/US2011/029450—ISA/EPO—May 24, 2011.

* cited by examiner

*Primary Examiner* — Justin Shepard
(74) *Attorney, Agent, or Firm* — Fulbright & Jaworski LLP

(57) ABSTRACT

Embodiments enable multimedia broadcast systems to temporarily suspend broadcast of data in an active content flow when insufficient data is available for efficient use of the broadcast bandwidth, while signaling receiver devices so they may deactivate receiver circuits to conserve power while data broadcasts are suspended. Flow content received in the broadcaster during the temporary suspension of data broadcasts may be stored in flow buffers for broadcast at the end of the temporary suspension. An indication of the duration of suspended data broadcasts may be included in the overhead information symbols (OIS) within the broadcast signal. Receiver devices receiving the indication of suspended data broadcasts may deactivate their receiver circuits for the indicated duration. The broadcast suspensions may be coordinated across multiple content flows so that receiver devices can periodically wake up at induced sleep intervals to monitor any data flow of the broadcast system.

93 Claims, 13 Drawing Sheets

INDUCED SLEEP INTERVALS FOR DEVICES RECEIVING BURSTY NON-REAL TIME BROADCAST FLOWS

TECHNICAL FIELD

The present invention relates generally to the operation of broadcast wireless networks, and more particularly to methods and systems for enabling receiver devices to conserve battery power while receiving bursty non-real time broadcasts.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to receiver devices. Mobile multimedia broadcast services allow users to view TV programming, as well as receive mobile editions of news, entertainment, sports, business, and other programming, using their cell phone or other wireless receiver device configured to receive the mobile broadcast transmissions.

SUMMARY

The various embodiments provide methods and systems to enable a multimedia broadcast provider to induce sleep intervals at the device during periods when flows are being broadcast. According to an embodiment, the broadcast provider may store flow content in its buffer memory during Internet Protocol (IP) datacast service (IPDS) flow transmission, which causes a delay period during which flow content is not broadcasted. The various embodiments provide methods and systems for broadcasting receiver device induced sleep interval value to receiver devices, enabling devices to enter a low power mode while IP datacast transmissions will not be broadcast. According to an embodiment, the induced sleep interval value may be broadcasted via the Overhead Information Symbols (OIS). The various embodiments enable receiver devices to receive the broadcast induced sleep interval value and deactivate their receiver circuit to conserve energy and resources until the indicated time at which data transmissions will recommence.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
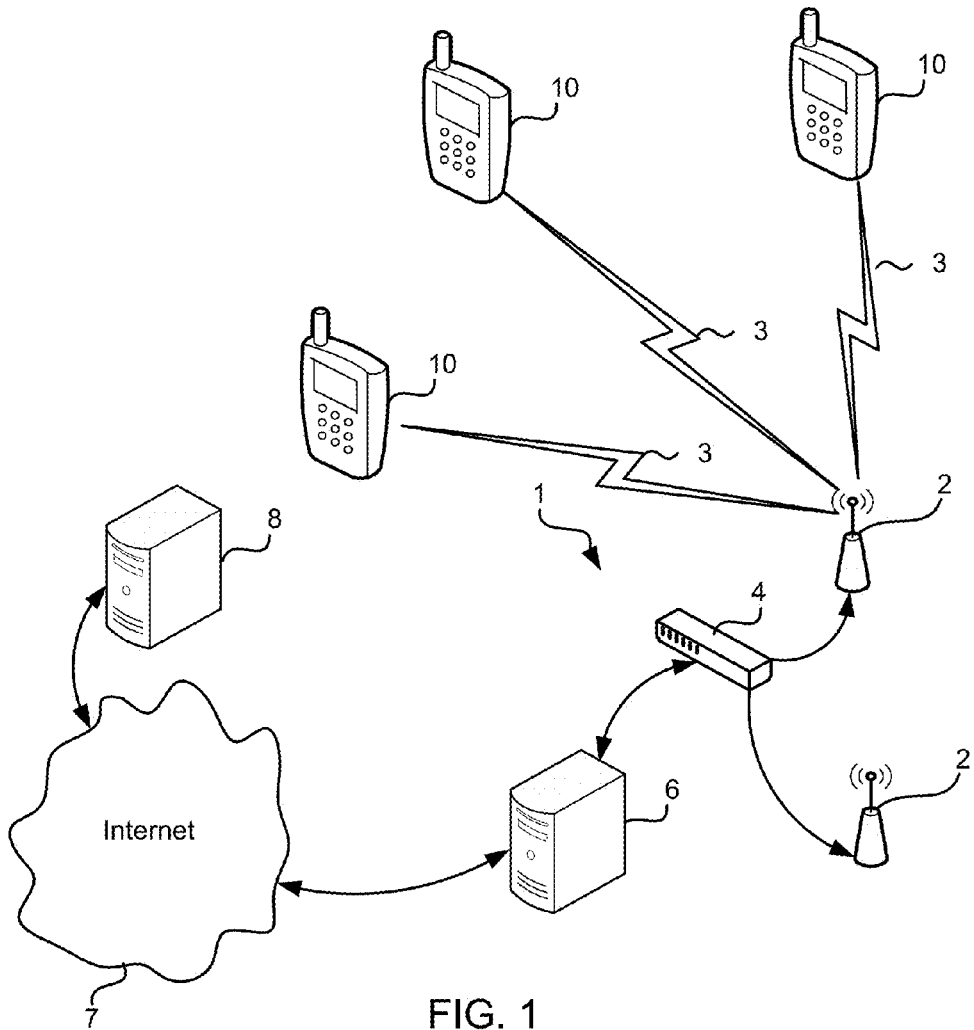
FIG. 1 is a communication system block diagram illustrating a mobile multimedia broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "receiver device" and "device receiver" are used interchangeably herein to refer to any one or all of cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and mobile multimedia broadcast receiver circuitry for receiving and processing mobile multimedia broadcast transmissions.

The word "broadcast" is used herein to mean the transmission of data (information packets) so that it can be received by a large number of receiving devices simultaneously. An example of a broadcast is IP datacast flows.

Mobile multimedia broadcast receiver devices are different from traditional television sets in that the devices are portable. Consequently, receiver devices configured to receive mobile multimedia broadcast services must be self-contained and designed to operate for extended periods of time on battery power. The need to be battery powered presents unique challenges to mobile multimedia broadcast systems.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO® by Qualcomm, Incorporated (San Diego, Calif.), Digital Video Broadcast IP Datacasting (DVB-IPDC), and China Multimedia Mobile Broadcasting (CMMB). For ease of description, the various embodiments are described using MediaFLO terminology; however, the use of such terminology is not intended to limit the scope of the claims to such technology.

A typical mobile multimedia broadcast network transmits content, such as television programs and IP datacasts, on a plurality of different channels or flows, thereby enabling several different programs and content to be broadcast simultaneously. Due to the nature of the broadcast transmission waveform, the plurality of different channels or flows may be carried over the same radio frequency spectrum, such as in an orthogonal frequency domain multiplex (OFDM) wave form, including a structure and information that enables each of the channels or flows to be selected and received by receiver devices. Individual channels or flows may be identified by an address or a flow identifier (ID). Information within the content description flow enables receiver devices to determine the particular address or flow ID to access in order to receive a particular content. Each content flow is carried on one or more multicast logical channels (MLC) of the physical layer, with the data provided to upper protocol layers which process the data to access a selected content flow and the information flow.

Typically, media access control (MAC) layer description information, sometimes referred to as the Overhead Information Symbols (OIS), is provided within a mobile broadcast signal which enables device receivers to receive particular content flows from the broadcast system. The OIS includes the overhead information that receiver devices need to locate and receive particular content flows from the broadcast signal.

Currently, receiver devices must check the OIS frequently, such as every superframe, to determine whether a content flow being monitored is currently carrying any data. In streaming video flows, such as a broadcast TV program, there can be a steady stream of data and a part of the OIS particular to the flow being received embedded in the MAC trailer of the MLC carrying the flow. In the case of a receiver device receiving an Internet Protocol Datacast Service (IPDS) flow, so long as the IPDS flow is active and data is being broadcast, the receiver device periodically checks the OIS to determine if there is any update to the control information. On some IP datacast streams the information may not be broadcast continuously, and instead may be sent in blocks or bursts. For example, an IP datacast of website content (e.g., an electronic newspaper update) may be interrupted periodically as the server receives content blocks via the Internet. Also, when the source data stream has a lower data rate than the IPDS broadcast data rate, the broadcast system may buffer received data until the full broadcast data rate can be used for a few seconds in order to maximize the use of the total broadcast bandwidth. As a result, IP datacasts may be "bursty" in that the broadcasts are made in bursts interspersed with periods of no data transmissions. In such systems, the flow is active and there can be information about it present in the OIS, but data is sent on the flow for only a fraction of the time. In a conventional system, when a receiver device is receiving an IPDS broadcast and the IPDS socket is constantly open (as will be the case so long as the device is monitoring the flow and content is being broadcast on the flow) and no data is broadcast, then the standby time of receiver devices listening for data may be reduced by, e.g., over 69% because of the OIS reads. Such reduction in standby time causes significant power consumption and an unnecessary drain on the battery of receiver devices especially since no data is being received.

Different approaches have been implemented for conserving battery power in receiver devices receiving multimedia broadcasts. One method for conserving energy includes an inactive selected content flow (i.e., it is not being broadcast) where receiver devices periodically wake up their receiver circuit to monitor changes in the control signaling of available in an overhead signal, e.g., the OIS flow, and deactivate their receiver circuit between such overhead flow monitoring cycles. Receiver devices may compute an appropriate monitor cycle based on certain broadcast parameters, such as, e.g., the MinMonitorCycleIndex parameter included in the System Parameters Message sent in the OIS. Although this method allows receiver devices to conserve energy while a flow is not being broadcast, it does not enable receiver devices to conserve energy and recourses when a flow is active and selected for reception by a device. Therefore, when a flow selected for reception is active, receiver devices must activate their receiver circuit at least every second (i.e., every superframe) to check the OIS for presence of data if no data is being broadcast.

Receiver devices continuously consume power listening to active flows in the background. A typical receiver device may consume 36 mA of power in such a mode. Typical receiver devices may consume about 140 mA when actively decoding a MLC. For example, when downloading a file in the background, such as downloading a clipcast file or an MPEG (Moving Picture Experts Group) file, typical receiver devices may consume about 30 mA of power because they do not deactivate their receivers even when no data is being transmitted (i.e., between broadcast bursts). This is because when the transmitted source is bursty, receiver devices must continuously check the OIS every superframe for the presence of data. This need to continuously monitor the OIS while monitoring a data flow is driven by the fact that the broadcast network headend cannot inform receiver devices when no data is going to be transmitted because the headend cannot predict when data will be available for transmission to the receiver devices in a bursty data stream.

The various embodiments provide methods for broadcasters to inform receiver devices about bursty broadcasts to enable receiver devices to reduce power consumption by deactivating their receiver circuit during periods of no data transmissions in an active data flow. In the various embodiments the broadcast system broadcasts information that induces artificial sleep intervals in receiver devices monitoring a particular active flow to coincide with delays in the broadcast of flow content. The embodiments enable broadcasters to cache content for broadcast until full superframes of data can be broadcast and synchronize the monitoring of the corresponding broadcast flow to coincide with broadcast bursts. To conserve energy, receiver devices may deactivate their receiver circuit for the duration of the induced sleep interval, and reenergize the receiver circuit when the broadcaster will begin transmitting data or announce another induced sleep interval.

In overview, the method for broadcasting flow content in a mobile multimedia broadcast system includes determining when broadcast of a data within a data flow should be suspended temporarily, determining a duration for suspending broadcasts of data within the data flow, broadcasting an indication of the determined duration of suspended data broadcasts to receiver devices, suspending broadcasts of data in the content flow for the determined duration without deactivating the flow, and storing flow content received from a content provider in a flow buffer for the determined duration. Broadcasters may send signals that induce OIS monitoring cycles at receiver devices listening to activated IPDC flows. For active flows with little or no buffered data, a server within the broadcast headend, e.g., a FLO Service Node (FSN) in the case of a MediaFLO system, may send a periodic activate flow request to the multiplexer within the headend identifying activation times that are multiples of the active flow monitoring cycle parameter.

The active flow monitoring cycle parameter may be provisioned per content flow by a broadcast scheduling server, such as the MediaFLO Provisioning Subsystem (MPS) in the case of a MediaFLO system. As an example, the activation times may be identified in terms of a number of superframes, and induced sleep intervals may be transmitted in the form of a superframe count down to a reactivation time or superframe number. The IPDC flow may remain active over the air from the perspective of being listed in the OIS and the control channel.

When sufficient data arrives in the headend server for broadcast in a flow, the transmission of induced sleep interval indicators may be stopped and data starts to be scheduled in the superframe corresponding to the last requested reactivation time. The induced sleep interval can also be ended by the deactivation of the flow due to either the end of an activity period or the expiry of the FLO Service Node inactivity timer for that flow.

The FLO Service Node may induce an artificial monitoring cycle for receiver devices listening to active flows for which the server has empty flow buffers (i.e., insufficient data is available to enable efficient use of the broadcast bandwidth) by periodically resetting the activation time of these flows at the multiplexer through an activate flow request message with a future activation time. In the case of a MediaFLO system, a NextSuperframeOffset field for an affected flow may count down towards the new activation time, such as in numbers of superframes until the activation time. New packets arriving at the FLO Service Node will not be part of the scheduling until the new flow activation time is reached. If the flow buffer is still empty at the end of scheduling negotiations of the superframe preceding the superframe where the flow is to become active for scheduling, then a new activate flow request may be sent by the FLO Service Node with an activation time set to the old activation time plus the active flow monitoring cycle seconds. Thus, if the FLO Service Node buffer of the flow remains empty or contains insufficient data to enable efficient use of broadcast bandwidth, a receiver device listening to the flow will wake-up at the end of every active flow monitoring cycle to check for data availability.

In an embodiment, the period of the induced sleep interval may be given by the flow Quality of Service (QOS) parameter active flow monitoring cycle in the case of a MediaFLO system. When a flow has no data to send in the FLO Service Node buffer, the FLO Service Node may send an ActivateFlowRequest to the multiplexer with a start time that is the next multiple in seconds or superframes of the active flow monitoring cycle parameter. Receiver devices monitoring such a flow in the background may be configured to obtain the active flow monitoring cycle and de-activate its receiver circuit until the indicated activation time, enabling devices to conserve battery power while no data is being transmitted without risk of missing a data transmission.

Example components of a typical mobile multimedia broadcast system are illustrated in FIG. 1. A mobile multimedia broadcast network 1 typically includes a plurality of broadcast transmitters 2 controlled by a mobile broadcast network control center 4. The mobile multimedia broadcast network 1 broadcasts content from the broadcast transmitters 2 as mobile broadcast transmissions 3 for reception by receiver devices 10. Within the mobile broadcast network control center 4 will typically be one or more servers 6 which may be configured to manage the scheduling of content broadcasts, generate electronic service guides and other metadata regarding the content broadcasts, and generate metadata messages for broadcast via the overhead flow of the mobile multimedia broadcast network 1. One or more servers 6 may be configured with software to function as a FLO Service Node in the case of a MediaFLO system. One or more servers 6 may also include connections to an external network, such as the Internet 7, through which the server 6 may receive content feeds from content provider servers 8. One or more servers 6 may be configured according to the various embodiments to receive content from content provider servers 8, store received content in a buffer for transmission, determine when the buffer is empty (i.e., there is insufficient data to transmit over the flow), send an activation flow request for inducing a monitoring cycle to a multiplexer server within the broadcast network control center 4 when the buffer is empty, and provide data for broadcast to the multiplexer server at the end of a monitoring cycle when the buffer contains data for broadcast.

Typically, mobile multimedia broadcast service providers receive a variety of different programs and content from different content sources and content providers. The mobile multimedia broadcast service provider typically stores content in a server, and schedules broadcast windows for each content flow. A broadcast window is a period of time in which a particular content is to be broadcast. To enable receiver devices to receive the content, the mobile multimedia broadcast service provider server will generate metadata messages for transmission via information and overhead flows that inform receiver devices when each program or content will be transmitted and the broadcast address on which the transmission will be made. Receiver devices can use the information in the metadata messages to determine if any of the content has been selected by the user for reception or download and, if so, determine the time to tune-in to the broadcast transmissions and the network address on which to receive the selected content. Receiver devices can receive content in the foreground, e.g., broadcast TV programs, and in the background, e.g., non-real time broadcasts like IPDS.

Figure 2:
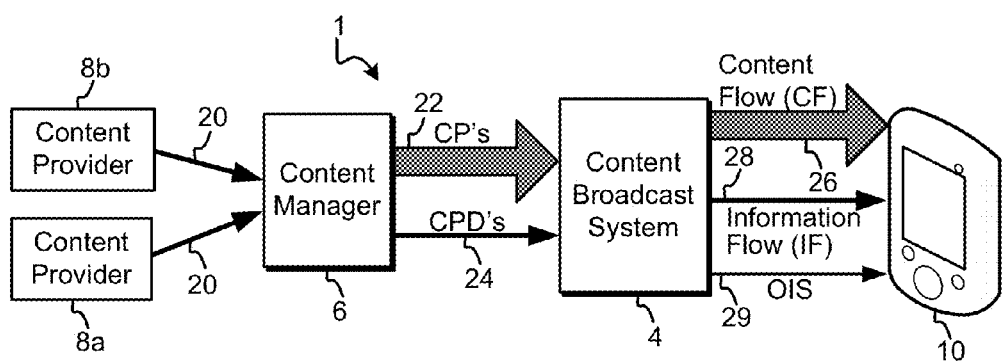
FIG. 2 is an alternative representation of a communication system block diagram of a mobile multimedia broadcast system.

FIG. 2 illustrates the generation and transmission of signals within a mobile multimedia broadcast network 1. As mentioned above, a mobile multimedia broadcast network 1 may receive content (e.g., television programs, websites, serial data feeds, etc.) from a number of content provider servers 8a, 8b. Such content may be provided to a content manager server 6 within a mobile multimedia broadcast network 1 via data networks 20 (e.g., the Internet 7). The content manager server 6 may store such content in a database and schedule the content for broadcast. In the case of IPDS content, the content manager server 6 may buffer data received from a content provider server 8a during a broadcast so that the content can be broadcast as it is received. In scheduling content for broadcast, the content manager server 6 may determine what will be broadcast when and on which broadcast stream (e.g., flow or channel number). As part of scheduling, the content manager server 6 may format the content into content packages (CPs). The content manager server 6 may also determine information about the content, such as a title of the information, its source (e.g., an Internet address, URL or producer), the nature of the information (e.g., sports, news, finance, etc.), its age or date/time of creation, and other information about the content that may be useful for selecting content matching user preferences.

The content manager server 6 may combine the scheduled broadcast time and address with the other information regarding the content (such as the associated media logical channels for each content flow) to generate content packet descriptions (CPDs) which may be broadcast in one or more information flows. When content is scheduled for broadcast, the content manager server 6 may provide the content packages to the content broadcast network control center 4 in an internal network dataflow 22, along with the content package descriptions in an internal network dataflow 24. These data flows can be processed by a multiplexer within the content broadcast system 4 into a multiplex broadcast waveform which can be broadcast by the broadcast transmitters 2 as broadcast transmissions 3, as shown in FIG. 1.

In order to fit the broadcast content within available bandwidth, the broadcast system allocates various content flows into one or more media logical channels which are defined in the multiplex to broadcast signal. In order to enable receiver devices to determine the media logical channels corresponding to particular content flow numbers, the broadcast signal also includes an overhead information symbols (OIS) flow of data which provides receiver devices with the control information required to receive the broadcast content. The content flow, information flow and OIS are encoded within the multiplex broadcast signal. Thus, the broadcast transmissions may include several different content flows (CF) 26 which are data packets carrying the broadcast content, one or more information flows (IF) 28 which include data packets carrying the content packet descriptions, and the OIS flow 29 which provides information that the broadcast receiver needs to receive the content and information flows 26, 28. Receiver devices 10 receive the broadcast transmissions and are able to separately process content flow 26 and the information flow 28 using the information provided in the OIS 29.

Figure 3:
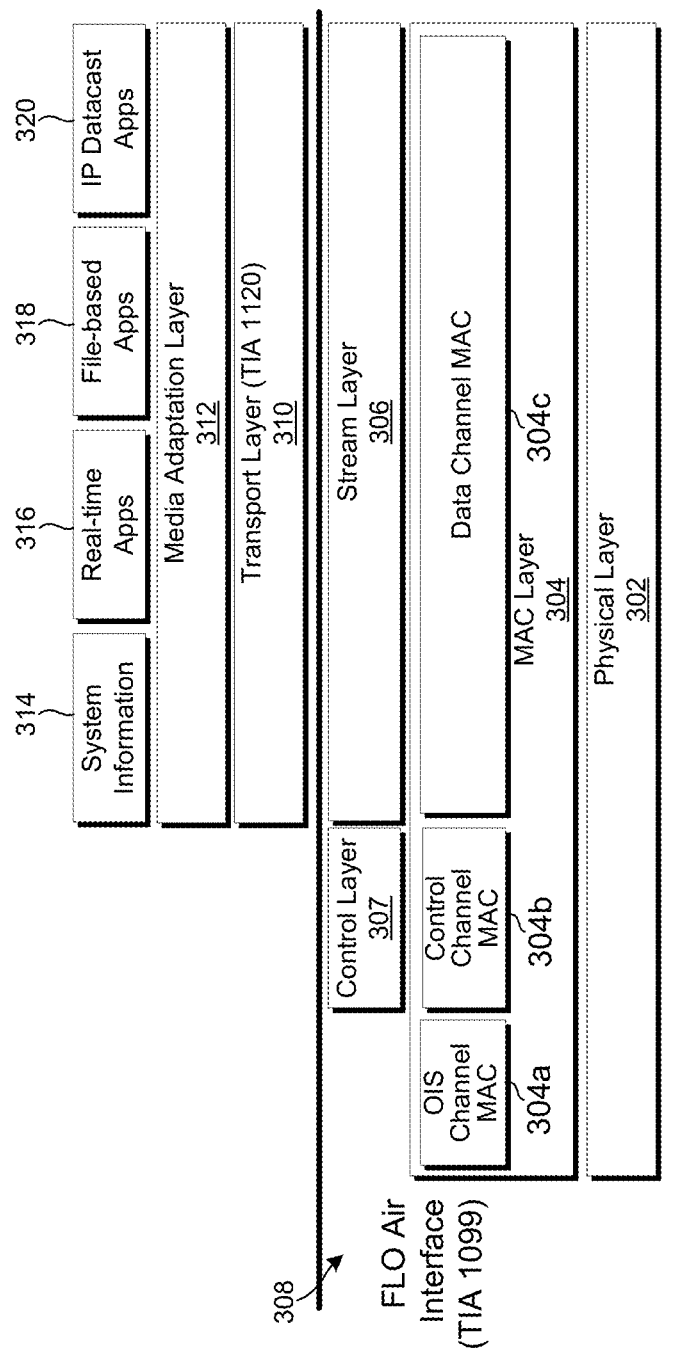
FIG. 3 is a communication and software protocol stack architecture diagrams illustrating how the various hardware and software protocol modules interact in a broadcast receiver according to an embodiment.

FIG. 3 is a protocol stack diagram illustrating the interactions of the various hardware and software protocol modules within a mobile broadcast receiver using a MediaFLO receiver as an example. A MediaFLO receiver will include a FLO air interface 308 which includes hardware and software modules defined by the Telecommunication Industry Association specification TIA 1099. The FLO air interface includes a physical layer 302 of radio components that receive the basic signal and provide the received data to a media access control layer (MAC layer) data communication protocol sub-layer 304. The MAC layer provides addressing and channel access control mechanisms that make it possible for various components of the receiver to receive the different stream of data encoded in the broadcast signal. The MAC layer may be implemented in hardware, in software, or in a combination of hardware and software which may be referred to as a medium access controller. The MAC layer may include an OIS Channel MAC 304a, a Control Channel MAC 304b, and a Data Channel MAC 304c.

The portions of the broadcast signal carrying the content and information flows may be passed by the MAC layer 304 to a stream layer 306 which is the data interface to the transport layer 310 (which is defined by TIA 1120) in the broadcast receiver. The FLO air interface 308 may also include a control layer 307 for controlling the various operations of the air interface. Broadcast data received in the transport layer 310 may be processed by a media adaptation layer 312, which functions to deliver data packets to the appropriate upper layer modules which can make use of the data, such as the system information module 314, real-time applications 316, file-based applications 318, and IP datacast applications 320.

Figure 4:
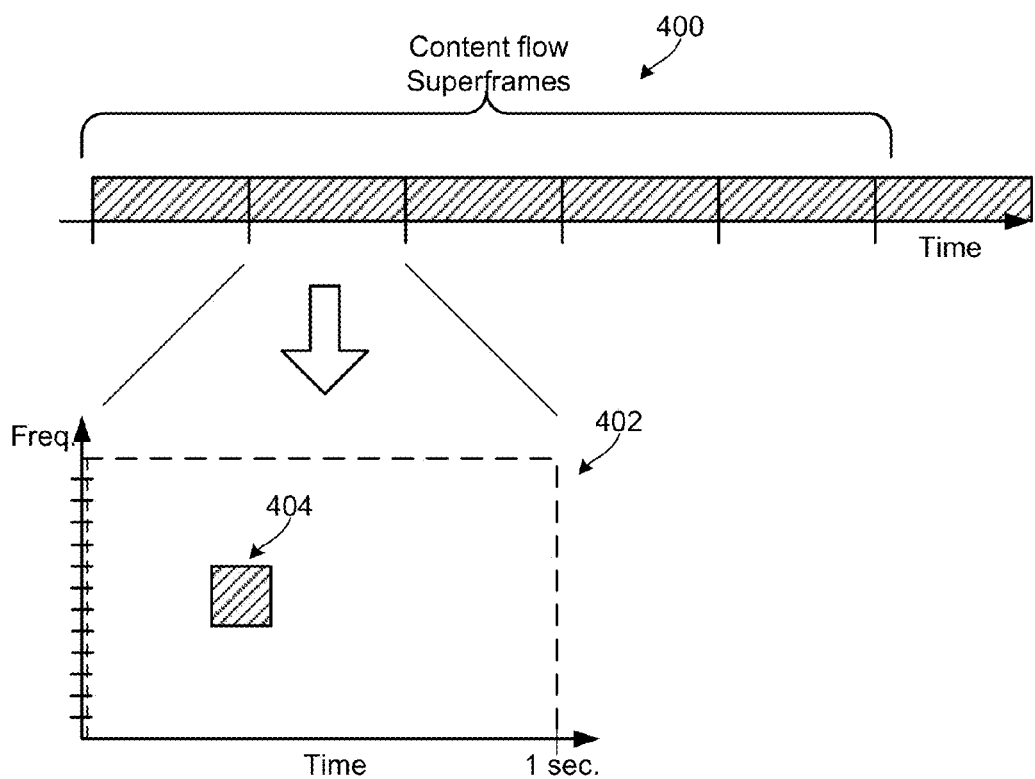
FIG. 4 is diagram of a broadcast datastream transmitted in OFDM format illustrating the Overhead Information Symbols (OIS).

FIG. 4 illustrates how in a typical mobile broadcast system data comprising the various content flows, information flows and overhead information (e.g., OIS flow) are transmitted in a series of superframes 400. For example, in the MediaFLO system each superframe 402 is set to be one second long. Content flows and overhead information flows are included within the superframes in sub-channels 404 within a portion of the OFDM signal defined in terms of frequency and time. The illustration of a sub-channel 404 as an area within the frequency and time domain defining a superframe is for illustration purposes only, because the information making up a flow is actually distributed throughout the superframe in a manner that is defined in technical specifications, e.g., TIA 1099. Information regarding how a particular sub-channel 404 within a superframe can be received is provided in overhead symbols, including the OIS which is typically broadcast as the first few milliseconds of each superframe 402. For example, in the Media FLO system, the first approximately 15 milliseconds of each superframe 402 carry the OIS information.

In an embodiment, with respect to FIG. 1, a content manager server 6 (e.g., a FLO Service Node in the case of a MediaFLO system) may transmit information to establish an artificial monitoring cycle that allows receiver devices 10 to conserve power by deactivating their receiver circuit for a period of time that data will not be broadcast during an active flow. To induce an artificial monitoring cycle, the content manger server 6 may delay the broadcast of content to receiver devices 10 by receiving and temporarily storing received data in a buffer memory and informing the receiver devices 10 about the duration or remaining time in the delay period (referred to herein as an "induced sleep interval"). Upon receiving the indication of an induced sleep interval, receiver devices 10 listening to the particular flow in the background may deactivate their receiver circuit for the duration of the induced sleep interval to conserver power if the device is not also monitoring another flow.

Since receipt of IP content data from a content provider server 8 may vary from second to second, the content manager server 6 may be configured to actively and continuously determine whether an induced sleep interval should be initiated and the duration of such a period based upon the received flow of data for broadcast. In an embodiment, the content manager server 6 may be configured to determine the need for and calculate a suitable length of an induced sleep interval based on parameters, like how full the content flow buffer is and the volume of content scheduled to be received or recently received from the content provider. In an embodiment, the content manager server 6 may determine the need for and duration of an induced sleep interval by determining how full the content flow buffer is at any given time (e.g., for each superframe or for a block of superframes). Monitoring the status of the flow buffer enables the content management server to determine whether there is enough data available for transmission to fill the next superframe. If the flow buffer holds less than a superframe's worth of data, the content management server 6 may be configured to induce a flow monitoring period, and suspend data broadcasts while storing incoming data in the flow buffer in order to enable efficient use of the broadcast bandwidth (i.e., by avoiding broadcasting less than full flow superframes). For example, when it determines that the flow buffer holds less than a superframe's worth of data, the content manager server 6 may delay broadcast of data for an induced sleep interval in order to refill the flow buffer, and continue in this mode until the flow buffer is sufficiently full to justify broadcasting data again. In order to avoid transmitting data in short bursts, (e.g., two to three superframes), the content manager server 6 may be configured to continue buffering content and repeating induced sleep intervals until the flow buffer holds sufficient data to support a sustained burst (e.g., until the buffer is full or until six or more seconds worth of data is cached).

If the flow buffer remains empty or contains less than a threshold amount of data at the end of an induced sleep interval, the content management server 6 may initiate another induced sleep interval in a similar manner. Receiver devices activating their receiver circuits at the end of the induced sleep interval will receive the indication of another induced sleep interval, and may promptly deactivate their receiver circuits.

In a further embodiment, the content manager server 6 may be configured to calculate the induced sleep interval based on the volume of content that is scheduled to be received from a content provider. This information may be provided by the content provider server 8 before content data is transmitted to the content manager server 6. For example, the content provider server 8 may inform the content manager server 6 about the amount of data that will be transmitted within the next few seconds to minutes. The content manger server 6 may then use such information to calculate an induced sleep interval based on its flow buffer size and current content, and an estimate of the data flow that is about to be received from the content provider server 8.

In a further embodiment, the content manager server 6 may be configured to calculate an induced sleep interval based on statistics calculated based upon the data flow received from a content provider. The content manager server 6 may be configured to monitor the receipt of data and calculate statistics characterizing the data flow (e.g., average bytes per second, standard deviation in data flow rates, average sizes of received bursts of data, and average gaps between received bursts of data). Such statistics may be computed over short and long intervals, such as statistics based upon the previous minute of the instant data flow and/or statistics based upon past data flows from the particular content provider. The content manager server 6 may then use such statistics to estimate future flow rates and reception gaps, and predict how fast the flow buffer capacity may be reached. For example, if statistics maintained by the content manager server 6 indicates that a data flow from a particular content server in the current time slot (e.g., 8:15 AM) is typically close to the broadcast rate and statistics regarding the data flow over the previous minute are consistent with the historical values, the content manager server 6 may use these statistics to determine that an induced sleep interval should be brief to ensure the capacity of the flow buffer is not exceeded before data broadcasts resume.

The content manager server 6 may be configured to inform receiver devices 10 about the induced sleep interval using different information broadcast techniques. In one embodiment, the content manager server 6 may transmit the duration or number of superframes of the induced sleep interval in the OIS (e.g., in the NextSuperframeOffset field of the OIS). Upon receiving an OIS that includes an induced sleep interval value for a particular flow, receiver devices 10 monitoring that flow may deactivate their receiver circuit for a period equal to the induced sleep interval. In doing so, the receiver devices 10 may determine the broadcast receiver activation time and schedule reactivation for that time. Alternatively, receiver devices may maintain a count down clock that will signal for receiver circuit reactivation (e.g., by issuing an interrupt) when the count down clock reaches zero. For example, if the induced sleep interval is five seconds, the content manager server 6 may transmit this value "5" in the NextSuperframeOffset field for the corresponding flow in the OIS of the first superframe in the induced sleep interval (i.e., the period during which data will not be transmitted). Upon receiving this OIS, the receiver devices monitoring that particular flow may deactivate their receiver circuit for a period of five superframes (i.e., five seconds in the case of a MediaFLO system).

After the five second period, the receiver 10 may reactivate their receiver circuit to receive the OIS in the next superframe following the induced monitoring period. If the OIS indicates that the superframe includes data in the monitored flow (e.g., the NextSuperframeOffset field is "0"), the receiver devices may receive the data from the superframe. If OIS includes another induced sleep interval value (e.g., the NextSuperframeOffset field is greater than "0"), those receiver devices may again deactivate their receiver circuit for the indicated time or number of superframes.

In an embodiment, during an induced sleep interval (i.e., during the time no data is being transmitted), the content manager server 6 may insert an induced sleep interval value (e.g., the NextSuperframeOffset field value in the SystemParameters message within the OIS) that counts down towards the end of the period. In this manner, receiver devices being turned on or accessing the particular flow during the period of no data transmissions will be informed of the time or superframes remaining before data will be transmitted (or another induced monitoring period initiated), enabling them to deactivate their receiver circuits until then to conserve power. For example, in the next superframe after initiation of a five-second induced sleep interval, the content manager server may insert the value "4" into the NextSuperframeOffset field in the SystemParameters message of the OIS to indicate that four superframes or four seconds remain in the period. Similarly, the NextSuperframeOffset field may contain the value "3" in the next superframe, and so on.

When receiver devices 10 are receiving multiple independent flows, such as flows from different IPDS sources, not all flows may be in induced monitoring periods at the same time, so not all receiver devices receiving a particular flow may benefit from a given induced monitoring period since the receiver circuit must remain on to receive the other flows. Even if two flows being monitored initiate induced monitoring periods, if those periods are not aligned, receiver devices monitoring both flows may not receive the full benefit from induced sleep intervals. This is because the device's receiver circuit must be energized whenever any of the monitored flows is broadcasting data or else it will not receive data in one or more of the monitored flows.

To avoid this conflict between different induced sleep intervals of multiple independent flows, an embodiment configures the content management server to align all of the induced artificial sleep intervals based on a common time anchor, such as common ending times (e.g., defined in terms of unix time) or common start times when all induced sleep intervals have the same duration. In this embodiment, which is described more fully below, receiver devices 10 may activate and deactivate their receiver circuit at the same times without missing data in each independent flow being monitored, enabling them to conserve battery power while monitoring multiple data flows. The most natural anchor time is unix time 0 for FLO devices. The content manager server 6 may use different methods to ensure that the activation time fall on time intervals that are a multiples of cycle duration in unix time seconds.

Generally, broadcast systems have an inherent time delay (i.e., a latency period) from the time the network control center receives flow content from a content provider until the content is broadcasted. Furthermore, flows have a maximum allowed end-to-end latency that includes the inherent time delay plus an additional latency to allow the system to schedule transmissions as efficiently as possible. In the MediaFLO system, the maximum latency signifies the end-to-end latency experienced by IPDC data from the ingress of IP data into the MediaFLO system to the receiver device's IP stack. This latency may include the FLO Service Node (FSN) latency (FSN queuing delay) and processing delays of other MediaFLO subsystems.

In an embodiment the induced sleep interval must be set to less than the maximum latency provisioned for a flow. If the induced monitoring period is longer than the maximum latency of the broadcast system, then data may be dropped by the FSN due to excessive queuing delay. For example, if the maximum latency of a flow is 40 seconds, the induced sleep interval should be set to a value less than 40 seconds, and the buffer of the FLO Service Node may be sized sufficient to cache as much data as may be received from data sources within the induced sleep interval.

In an embodiment, the maximum flow monitoring period may be determined by dividing the maximum latency provisioned for the flow by a predetermined number, such as "2". In this manner, the maximum flow monitoring period, which may be used to define an induced sleep interval for receiver devices, may be set well below the maximum desired delivery latency. For example, if the maximum latency of a broadcast system is 40 seconds, the maximum flow monitoring period and the induced sleep interval may be 20 seconds.

Figure 5A:
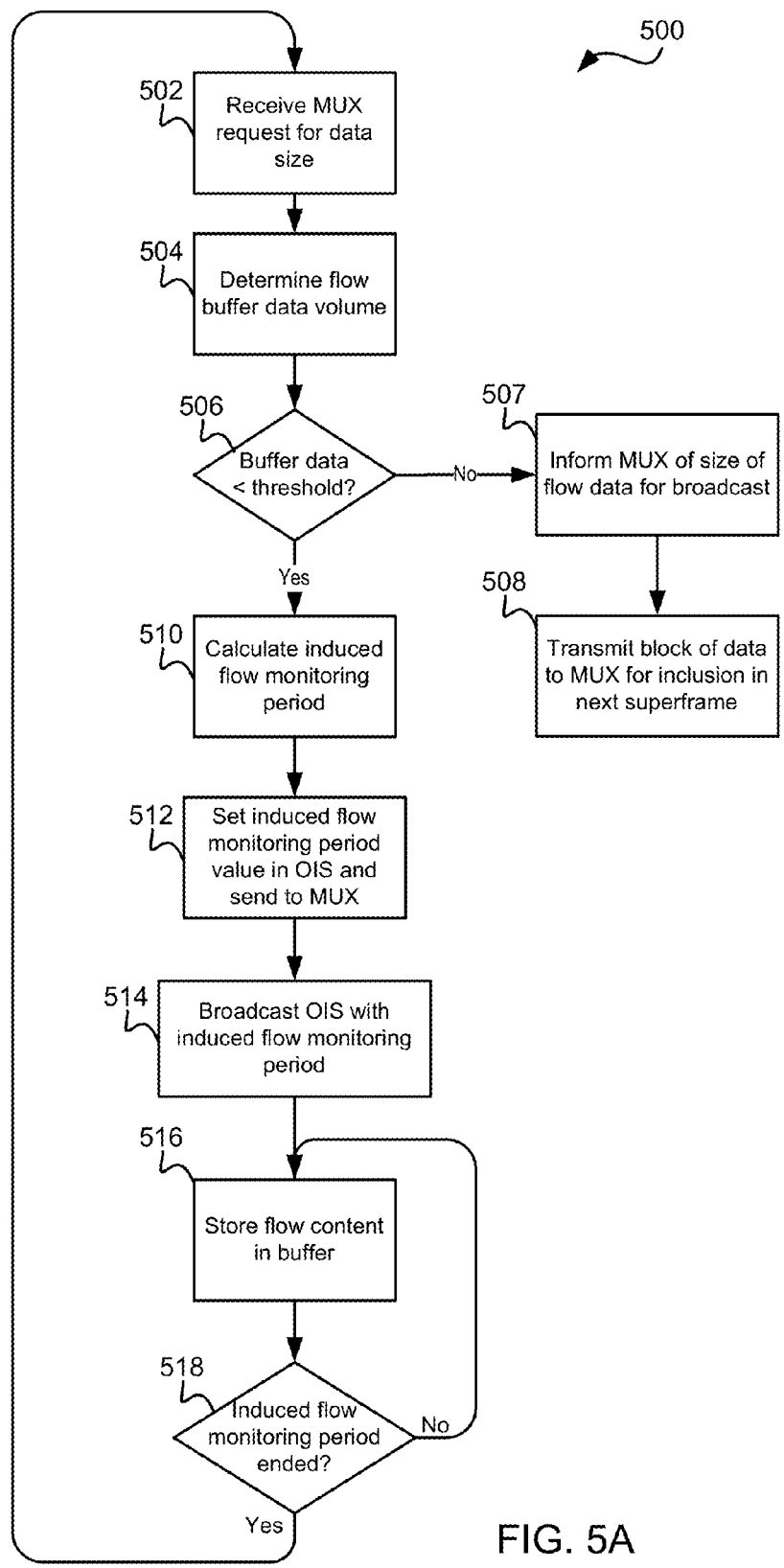
FIGS. 5A and 5B are process flow diagrams of two embodiment methods for inducing a sleep interval in receiver devices.

FIG. 5 illustrates an example method 500 for implementing an induced sleep interval according to an embodiment in a MediaFLO system implementation. In a MediaFLO broadcast system, the FLO Service Node (FSN) may receive a request for data size for one or more up coming superframes from the broadcast multiplexer (MUX) in step 502. This request for data size is part of the process used by the multiplexer to determine how to efficiently fit all of the data flows within the bandwidth of the multiplexed signal. In response to such a request, the FLO Service Node may determine the volume of data stored in the flow buffer or the degree to which a flow buffer is filled with data for transmission in step 504. In determination step 506, the FLO Service Node may determine whether the amount of data stored in the flow buffer usage is less than a threshold above which the broadcast of data should continue (e.g., sufficient data to fill one or more superframes). The buffer threshold amount may represent an amount of data sufficient to ensure efficient use of broadcast bandwidth over the next one to two superframes. If the contents of the flow buffer exceed the threshold (i.e., determination step 506="No"), the FLO Service Node may inform of the multiplexer of the size of the flow data for broadcast in step 507, and transmit the next superframe's worth of flow data to the multiplexer for broadcast in step 508.

If the contents of the flow buffer are less than the threshold (i.e., determination step 506="Yes"), the FLO Service Node may calculate an induced sleep interval period that should be implemented in step 510. As discussed above, this calculation may take into account the degree to which the flow buffer is full and a rate at which content data is being received from a content provider. In step 512, the FLO Service Node may transmit information to the multiplexer indicating the induced sleep interval period for incorporation in the OIS (or other overhead data such as the embedded OIS). This may be accomplished by setting the NextSuperframeOffset field value to the calculated induced sleep interval period, and providing the NextSuperframeOffset for inclusion the OIS. Alternatively, the FLO Service Node assemble the flow overhead data including the NextSuperframeOffset field and provide that the formatted OIS to the multiplexer. As part of step 512, the FLO Service Node may also respond to the multiplexer request for data size with a zero value. The OIS including the NextSuperframeOffset field set to the induced sleep interval period may then be broadcast in the next superframe in step 514.

At this point, the FLO Service Node may store data received for a flow undergoing an induced sleep interval within the flow buffer for the duration of the induced sleep interval period, step 516, which continues until the FLO Service Node determine that the period has expired in determination step 518. During the period of the induced monitoring period while received data is stored in the flow buffer, the FLO Service Node will inform the multiplexer that no data will be broadcast in the particular flow in response to requests for data sizes (i.e., in response to step 502). When the induced sleep interval period expires (i.e., determination 518="Yes"), the processor may continue as described above when the FLO Service Node receive the next request for data size from the multiplexer in step 502.

In an embodiment, the duration of all induced sleep intervals may be set to a standard duration (e.g., a constant stored in memory or set in executable logic) that does not depend upon the amount of data present in the flow buffer. Thus, in step 510, the calculation may simply involve using a duration stored in memory or coded within the FLO Service Node operating software. For example, all induced sleep intervals may be five seconds in duration, at the conclusion of which receiver devices will wake up (i.e., activate their receiver circuit) to receive the OIS and determine whether data is being transmitted or whether a new induced sleep interval has been initiated. As a result, in this embodiment, all receiver devices receiving bursty flows will periodically wake up (i.e., activate their receiver) at the same predetermined induced sleep interval period, even if no data is available to be received.

In another embodiment, the duration of each induced sleep interval may be determined based upon the amount of data stored in the flow buffer and the rate at which data is being received from the source. From this information, the FLO Service Node may estimate how quickly the flow buffer could fill up, and select an induced sleep interval that is short enough to ensure that no data is lost by the flow buffer filling to capacity before transmission of data resumes.

In an embodiment, the decision to initiate an induced sleep interval in determination block 506 may be made when the flow buffer is determined to be empty. In other words, the threshold for broadcasting data is any value greater than zero, and the threshold for initiating an induced sleep interval is an empty state of the flow buffer. Thus, so long as there is data in the flow buffer to broadcast, the data flow can continue to broadcast such data, and an induced sleep interval will only be initiated if the flow buffer becomes empty.

Figure 5B:
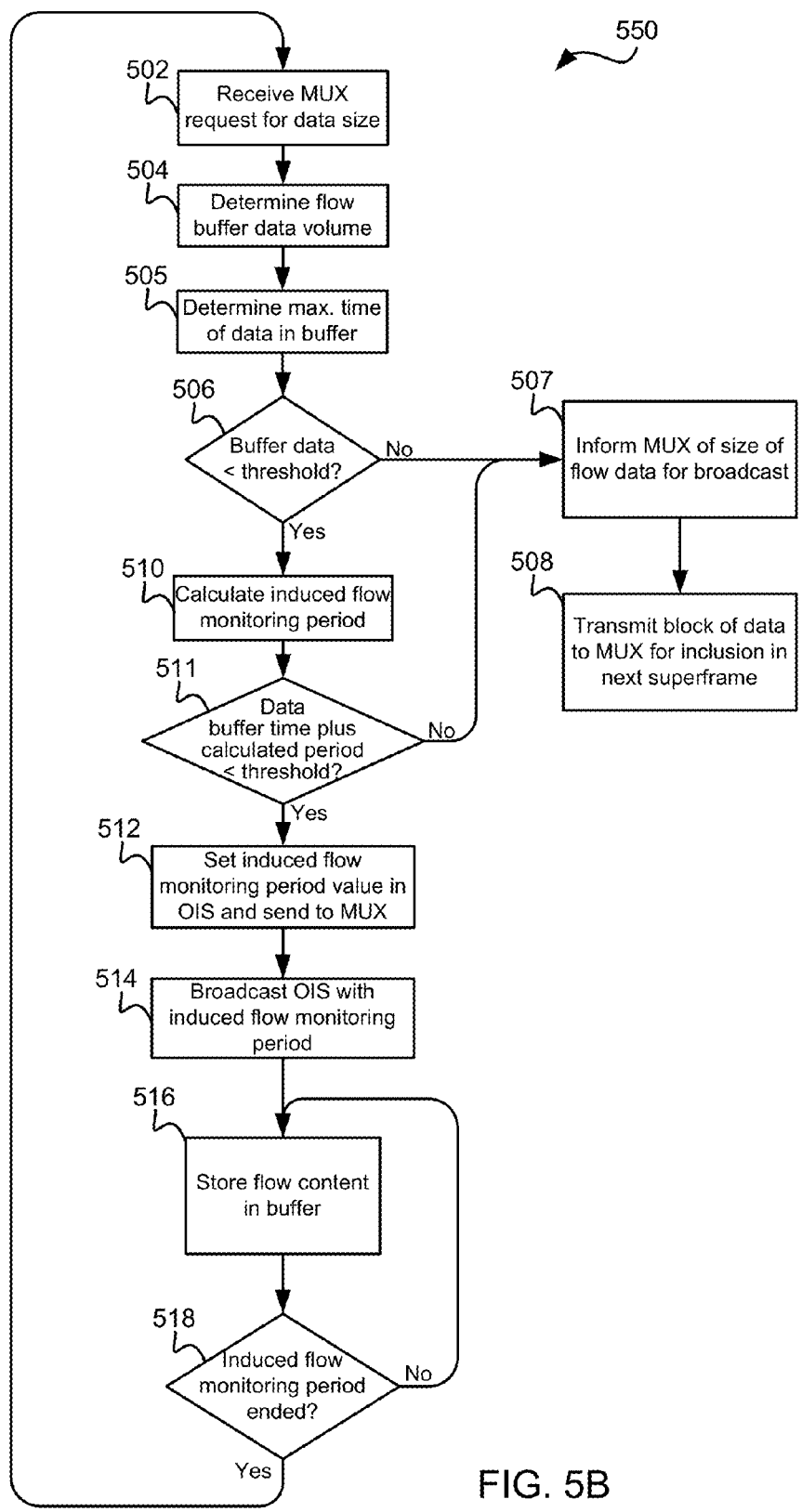

In another embodiment, the decision to initiate an induced sleep interval in determination step 506 may be made when the buffer contains some data but the amount of data is less than a threshold that is greater than zero. For example, the flow buffer threshold may be set to a value that ensures the data flow will fully utilize the broadcast bandwidth for one to two seconds. Some accommodations may be necessary in this embodiment to ensure that small amount of data is not left in the flow buffer so long that it becomes unusable or otherwise "stale." An example method 550 suitable for implementing this embodiment is illustrated in FIG. 5B. In this embodiment, method 550 is similar to method 500 described above with reference to FIG. 5A, with the addition that the FLO Service Node may determine the maximum duration that data has been pending in the flow buffer for transmission in step 505. This determination may be based upon the earliest time that data in the flow buffer was written to the buffer, rather than the last time the data was written to the flow buffer, to ensure that none of the data in the buffer will become stale if an induced sleep interval is initiated. Then, if the FLO Service Node determine that the flow buffer is empty enough that an induced sleep interval should be initiated (i.e., determination step 506="Yes"), in step 511 the FLO Service Node may determine whether the maximum time that data has been pending in the flow buffer (determined in step 505) plus the calculated duration of an induced sleep interval (calculated in step 510) is less than a staleness threshold. If the FLO Service Node determines that an induced sleep interval would cause data in the flow buffer to become stale (i.e., determination step 511="No"), the FLO Service Node may inform the multiplexer of the size of the flow data for broadcast in step 507, and transmit the next superframe's worth of flow data to the multiplexer for broadcast in step 508. If the FLO Service Node determines that an induced sleep interval will not cause data in the flow buffer to become stale (i.e., determination step 511="Yes"), the FLO Service Node may initiate an induced sleep interval by proceeding with steps 512 through 518 as described above with reference to FIG. 5A.

Thus in this embodiment, if the FLO Service Node determines that the total wait time of data residing in the flow buffer after an induced sleep interval will be longer than some system staleness threshold, the data may be immediately broadcast even though the amount of data may be less than the threshold for initiating an induced sleep interval. This embodiment enables the greater utilization of the broadcast bandwidth and saving of receiver device battery power by enabling induced sleep intervals to be initiated when there is insufficient data within the flow buffer to enable full bandwidth utilization, while ensuring that the data cached in the flow buffer will not be held so long that it becomes stale.

In a further embodiment mentioned above, the induced sleep intervals initiated on all data flows within the broadcast network may be coordinated so that receiver devices monitoring more than one data flow may conserve battery power by deactivating their receiver circuit when all of the data flows being monitored are transmitting a coordinated induced sleep interval. This may be accomplished by defining a maximum duration for induced sleep intervals on all data flows (e.g., five seconds as illustrated in the figures), and initiating all induced sleep intervals at time increments so that induced sleep intervals on all data flows end at the same time (referred to herein as a time anchor). Thus, in step 512 or 514 of FIGS. 5A and 5B, the broadcast of the OIS including a NextSuperframeOffset value greater than "0" may be caused to occur at a time that can ensure the induced sleep interval will end at a coordinated time anchor.

Figure 10:
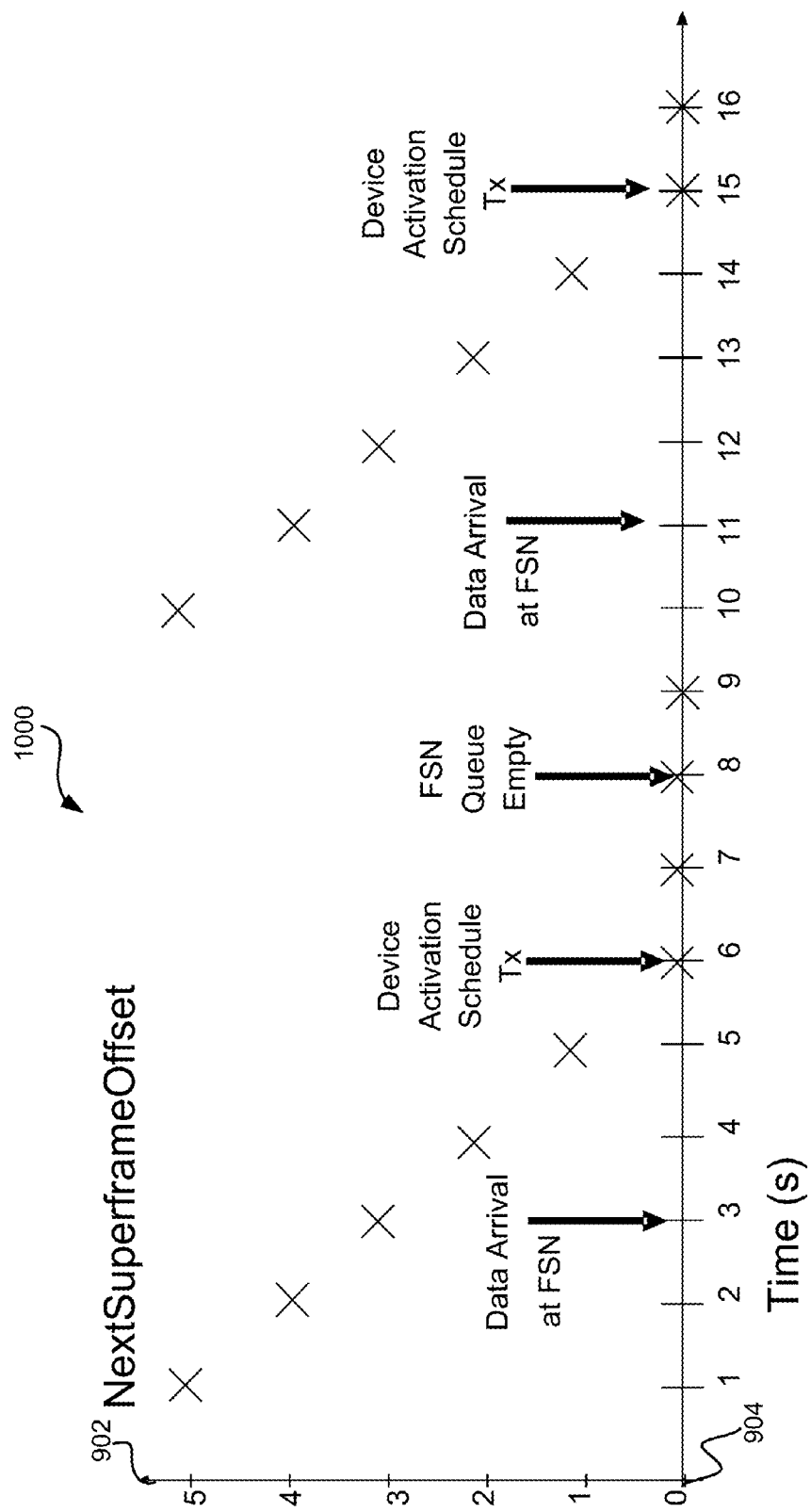

In an embodiment in which the duration of all induced sleep intervals is set to a predetermined constant duration, the coordination of induced sleep intervals across all data flows may be accomplished by requiring that induced sleep intervals begin at common time anchors that are multiples of the predetermined induced sleep interval duration. For example, if the standard induced sleep interval duration is five seconds, the FLO Service Node 602 may be configured to initiate an induced sleep interval only at time values equal to a multiple of five seconds (e.g., at seconds 0, 5, 10, 15, etc., within each minute according to the system clock). The example described below with reference to FIG. 10 illustrates such an embodiment.

The coordination of induced sleep intervals across all data flows may also be implemented in embodiments which permit induced sleep intervals to be less than the maximum duration (e.g., two or three seconds in duration), in which case the common time anchor is the time that all induced sleep intervals end. In such embodiments, and also with respect to FIGS. 5 and 6, the FLO Service Node 602 may determine the duration of a next induced sleep interval in step 510, such as based upon the average dataflow rate and the current capacity of the flow buffer, with the duration being limited to a maximum value as described above. Thus, if the flow buffer is empty and the average data rate from the data source is such that a maximum duration induced sleep interval could result in lost data, the FLO Service Node 602 may set the duration for the next induced sleep interval in step 510 at a value less than the maximum duration. In order to ensure the induced sleep interval is synchronized with those on other data flows, the beginning of that induced sleep interval may be delayed in step 512 or 514 until such time that the end of the cycle will correspond to the end of induced sleep intervals on all other data flows. For example, if the maximum induced sleep interval duration is five seconds, all dataflow induced sleep intervals may be coordinated to terminate on multiples of five seconds (e.g., at seconds 5, 10, 15, etc., within each minute according to the system clock). Thus, if the FLO Service Node 602 determines in step 510 that the induced sleep intervals should only be 3 seconds in duration, it may initiate the induced sleep interval 3 seconds before a multiple of 5 seconds, such as at 2 seconds, 7 seconds, 12 seconds, etc. In this manner, receiver devices monitoring multiple data flows can deactivate their receiver circuits for 3 seconds, thereby conserving battery power while data is not being transmitted, and wake up to receive the OIS at the same time on all data flows.

Figure 6:
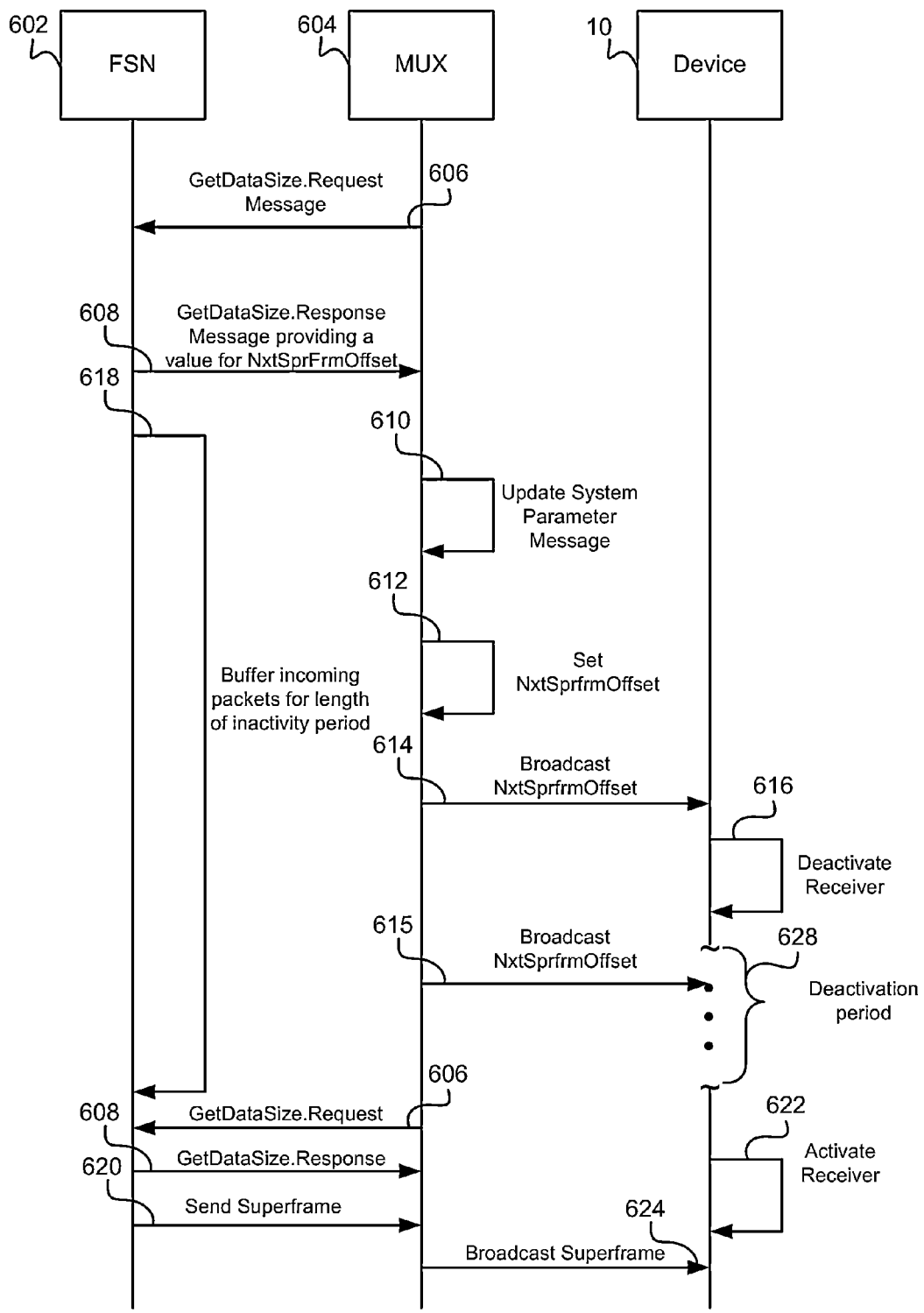
FIGS. 6 and 7 are message flow diagrams of messages and operations involved in the embodiment method of FIG. 5.

Example messages that may be exchanged among the FLO Service Node, the multiplexer and receiver devices that may occur in the process of an induced sleep interval are illustrated in FIG. 6. The FLO Service Node (FSN) 602 may receive a GetDataSize.Request message from the multiplexer 604, message 606. If the FLO Service Node 602 determines that there is insufficient data in the flow buffer to support efficient broadcast of the data flow, it may send a GetDataSize.Response message to the multiplexer 604 that initiates an induced sleep interval, such as by including an integer larger than zero for inclusion in the NextSuperframeOffset field in message 608. For example, if the FLO Service Node 602 calculates the induced sleep interval should be five seconds, the FLO Service Node 602 may inform the multiplexer 604 about this induced sleep interval in the GetDataSize.Response message 608.

In response to receiving such a message, the multiplexer 604 may update the System Parameter Message in operation 610, and set the value of a NextSuperframeOffset field in operation 612 based on the induced sleep interval value received from the FLO Service Node 602 in message 608. The multiplexer 604 may provide the multiplexed signal, including the NextSuperframeOffset in the OIS configured in operation 612, for broadcast to the receiver devices 10, message 614. The multiplexer 604 may then decrement (i.e., count down) the induced sleep interval value and broadcast the decremented value in the next OIS NextSuperframeOffset field in the next superframe, message 615.

Receiver devices 10 receive the OIS within message 614, retrieve the induced sleep interval value from the NextSuperframeOffset field of the OIS and deactivate their receiver circuit for the induced sleep interval value in operation 616. The receiver devices 10 not receiving another flow may deactivate their receiver circuit for a period of time 628 indicated in the NextSuperframeOffset field of the OIS in message 614. In operation 622, receiver devices 10 may activate their receiver circuit at the conclusion of the induced sleep interval to receive the next broadcast superframe, message 624.

During the induced monitoring period the FLO Service Node 602 will continue to buffer incoming packets and information related to the flow in operation 618. Near the conclusion of the induced monitoring period, in response to receiving a GetDataSize.Request message from the multiplexer 604, message 606, the FLO Service Node 602 may reply with a GetDataSize.Response message to the multiplexer 604 that identifies a size of data to be provided for broadcast, after which the FLO Service Node 602 may send a superframe's worth of data to the multiplexer 604 in message 620. The multiplexer 604 may format that data for broadcast in the next superframe, message 624.

Figure 7:
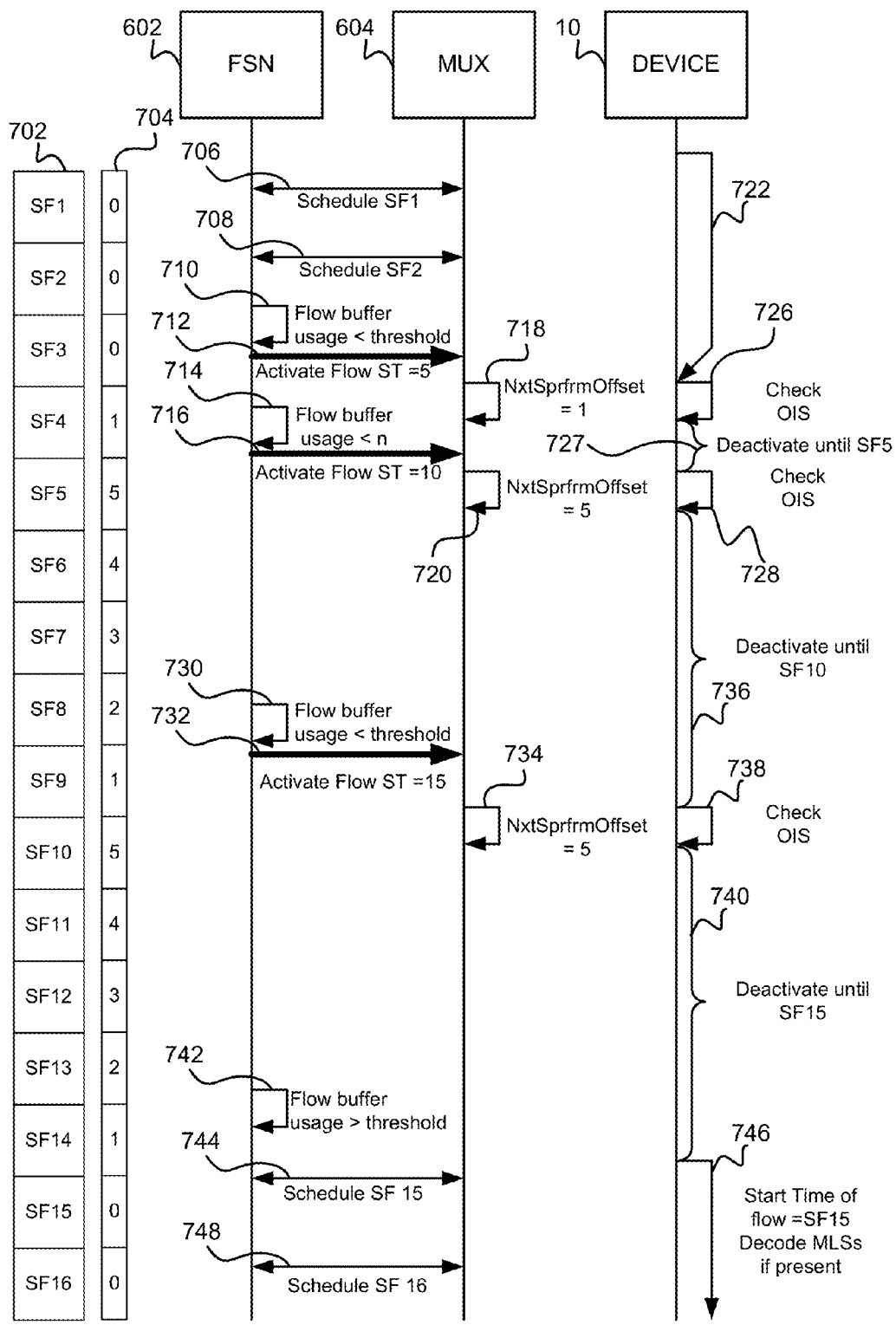

As a further example, FIG. 7 is a more detailed message flow diagram showing more of the operations and messages involved in the embodiment method described above with reference to FIG. 5. Column 702 shows a series of superframes from SF1 to SF16. Column 704 shows the induced sleep interval value, such as may be included in the NextSuperframeOffset field. The FLO Service Node (FSN) 602 may receive content data from a content provider server and incorporate the data in a packet of data intended for the next superframe and transmit that packet of data to the multiplexer 604. For example, the FLO Service Node 602 may send a packet of data scheduled for superframe SF1 in message 706, and a packet of data scheduled superframe SF2 in message 708, to the multiplexer 604. Since induced flow monitoring in not implemented during superframes SF1 and SF2, the superframe offset values included in superframes SF1 and SF2 are "0." Before superframe SF3, the FLO Service Node 602 may determine that flow data stored in the flow buffer is less than a threshold and begin to store data received from the content provider in a flow buffer in operation 710. Based on the amount of data stored in the flow buffer and the rate that data is received from the content provider, the FLO Service Node 602 may determine that the next superframe which will include flow data will be SF5 and transmit that information to the multiplexer 604 in message 712. The multiplexer 604 may receive that message and set the value of the NextSuperframeOffset field to "1" in operation 718, and transmit the NextSuperframeOffset value to the receiver devices 10 in the OIS in superframe SF4 (message transmission not shown). This is illustrated in column 704 which includes a value at SF4 of "1." The receiver device 10 may check the OIS in operation 726, and deactivate its broadcast receiver for one superframe in operation 727.

The FLO Service Node 602 may again monitor the amount of data stored in its flow buffer during superframe SF4 and determine an additional induced sleep interval value in operation 714. The FLO Service Node 602 may transmit message 716 to the multiplexer 604 indicating that the next superframe with data will be SF10. In response, the multiplexer 604 may set the value of the NextSuperframeOffset at "5" in operation 720, since the maximum induced sleep interval duration in this example is five superframes. This NextSuperframeOffset may be included in the OIS transmitted to the receiver devices in SF5 (message transmission not shown). The receiver device 10 may activate its broadcast receiver at SF5 based on the previous NextSuperframeOffset value and check the OIS in operation 728. The receiver device 10 may receive the NextSuperframeOffset value of "5" and again deactivate its receiver circuit for a duration of 5 superframes in operation 736.

In each subsequent superframe period 702, the multiplexer 604 may format an OIS including the number of superframes remaining before data may be transmitted, as illustrated in column 704. In the media flow system, this information is specified in the NextSuperframeOffset data field within the OIS. Therefore, for ease of reference, the number of superframe's remaining before data to be transmitted is referred to as the NextSuperframeOffset value hereinafter. Thus, the offset period 704 in SF6 is "4," in SF7 is "3," in SF8 is "2," in FS9 is "1," and in SF9 is "0." If a receiver device 10 happens to come online during this countdown, the receiver device 10 may interpret the NextSuperframeOffset to determine when data may be broadcasted (e.g., in three superframes in the case of SF7).

The FLO Service Node 602 may again determine the amount of data stored in its flow buffer during superframe SF9 in operation 730. In this example, FLO Service Node 602 determines that the data stored in the flow buffer is still less than the threshold, so the FLO Service Node 602 sets the induced sleep interval to "5" again and transmits message 732 to the multiplexer 604 indicating that the next superframe with data will be SF15. In response, the multiplexer 604 may set the NextSuperframeOffset value to 5 in operation 734, and broadcast the NextSuperframeOffset in the OIS in the next superframe (message transmission not shown). The receiver devices may activate their receiver circuit at superframe SF10, check the broadcast OIS in operation 738, and deactivate their receiver circuit again for another five superframes (i.e., until SF15) in operation 740.

The FLO Service Node 602 can again determine the amount of data stored in its flow buffer during superframe SF14 in operation 742 to determine whether the amount of data stored in the flow buffer satisfies the threshold for continuing broadcasted data. In this case, the FLO Service Node 602 may send a superframe's worth of stored data to the multiplexer 604 for broadcast in superframe SF15 in message 744. The multiplexer 604 may then format a multiplex signal including the flow data for broadcast to the receiver devices 10. Receiver devices 10 may activate their receiver circuits in time to receive superframe SF15 based on the NextSuperframeOffset value and begin receiving data in operation 746.

Figure 8:
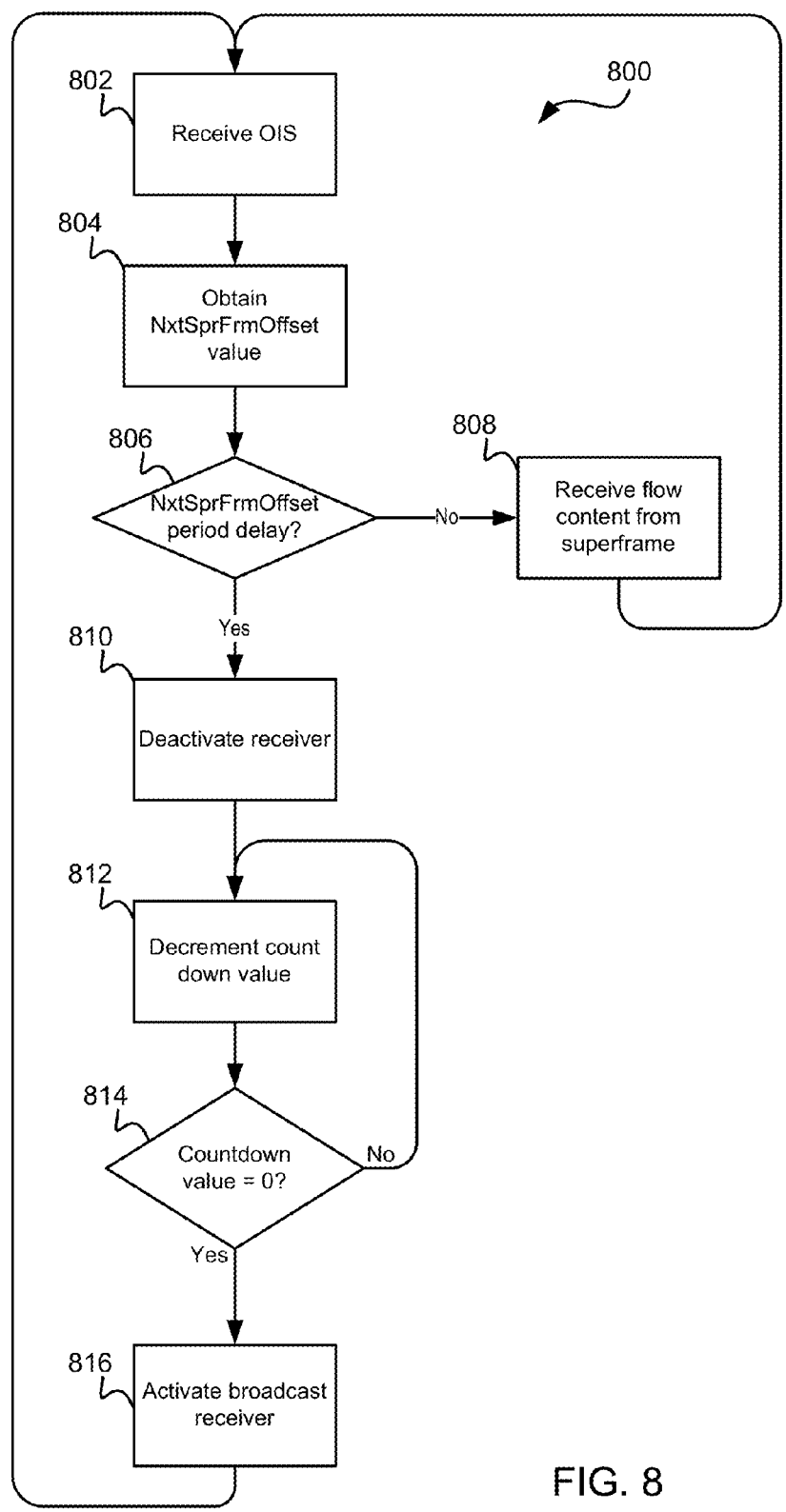
FIG. 8 is a process flow diagram of an embodiment method for implementing the induced sleep interval in receiver devices.

FIG. 8 illustrates a method 800 for deactivating a receiver circuit in a receiver device 10 in response to an induced sleep interval. The receiver device 10 may receive the OIS within a superframe in step 802, and retrieve the NextSuperframeOffset value in step 804. The receiver device 10 may determine whether an induced sleep interval has been initiated based on the value of the NextSuperframeOffset in determination step 806. If the NextSuperframeOffset value does not indicate a delay period (i.e., determination 806="No"), the receiver device 10 may receive and decode the superframe to receive the flow content in step 808, and then receive the OIS of the next superframe by returning to step 802.

If the NextSuperframeOffset value indicates an induced monitoring period is being initiated (i.e., determination 806="Yes"), the receiver device 10 may deactivate the receiver circuit for the duration of the induced sleep interval indicated by the NextSuperframeOffset value in step 810. The receiver device 10 may then count down to the time to reactivate the receiver circuit, such as by decrementing a counter value in step 812 and determine whether the counter value has reached zero in determination step 814. If the induced sleep interval has not ended (i.e., determination step 814="No"), the receiver device 10 may continue to decrement the count down value by returning to step 812. If the induced sleep interval is ended (i.e., determination step 814="Yes"), the receiver device 10 may reactivate the receiver circuit in step 816, and receive the OIS in the next superframe by returning to step 802.

Figure 9:
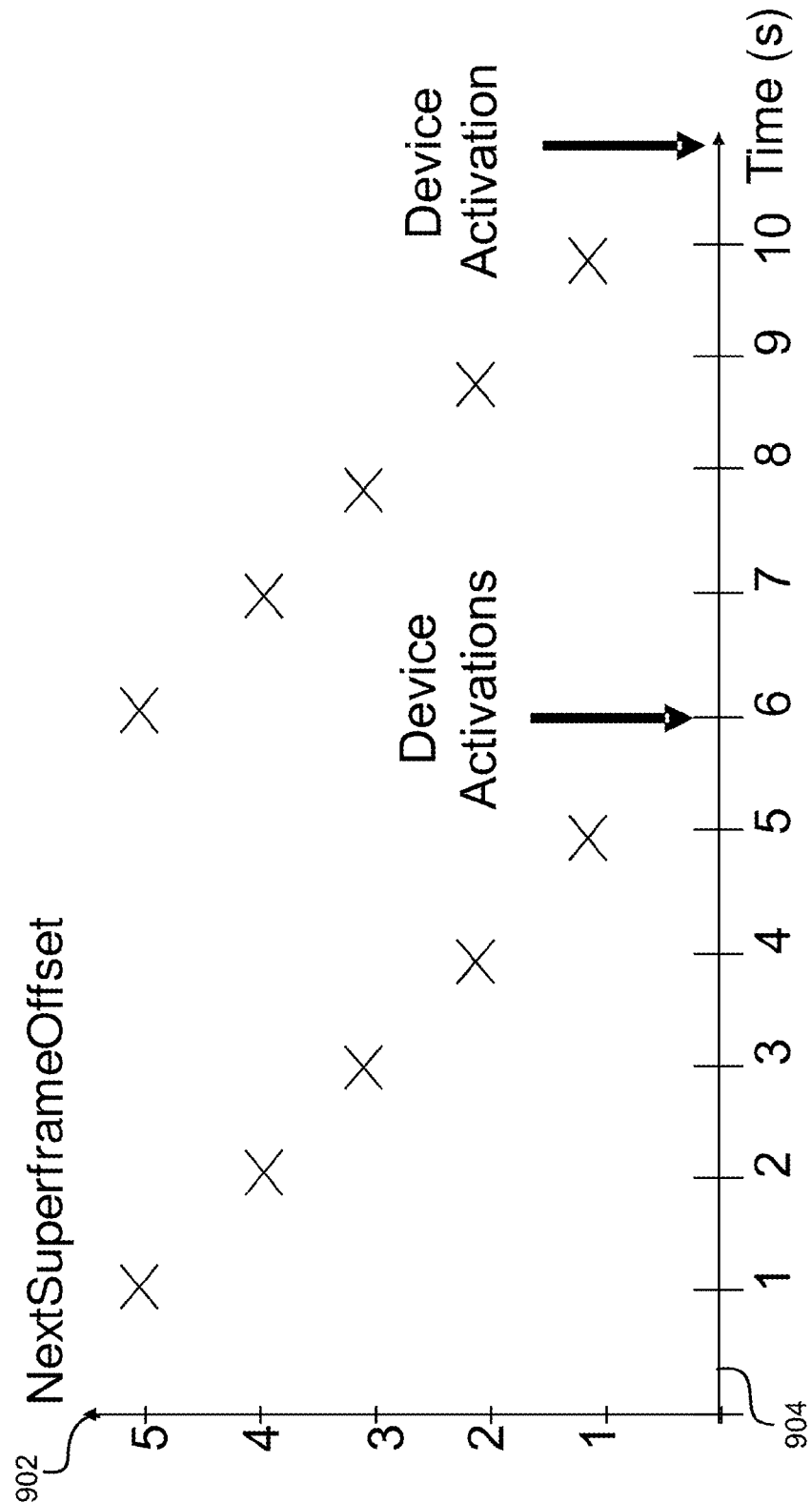
FIGS. 9 and 10 are graph diagrams of embodiment methods for counting down the induced sleep interval to determine the broadcast receiver activation.

As an example, FIG. 9 is a chart illustrating how NextSuperframeOffset values may be broadcast in a manner that counts down to the end of an induced sleep interval. The vertical axis 902 represents the NextSuperframeOffset value included within an OIS, while the horizontal axis 904 represents time or superframes. The NextSuperframeOffset value included in a particular superframe is indicated by the "X" as read against the vertical axis. In this example, the duration for induced monitoring periods is five seconds in unix time, which equates to five superframes in a MediaFLO® system. A receiver device receiving any of the NextSuperframeOffset values in superframes 1-5 would leave its receiver circuit de-energized until superframe 6, at which point the receiver device 10 may activate its receiver circuit again. In the received OIS, the receiver device would retrieve another NextSuperframeOffset value of "5", so again the receiver device 10 would deactivate its receiver circuit and begin counting down seconds from "5" to "0" and then reactivate the receiver circuit at time "11" (not shown).

As a further example, FIG. 10 is another chart illustrating how NextSuperframeOffset values may be broadcast. In this example, the duration for induced monitoring periods is five seconds in unix time, which equates to five superframes in a MediaFLO® system. In the illustrated example, at time "0," the receiver device 10 receives an OIS including a NextSuperframeOffset value of 5. In response, the receiver device 10 may deactivate its receiver circuit and begin a five second count down. In this example, at unix time "3", the FLO Service Node (FSN) 602 receives data from the content provider, which is stored in the flow buffer, and determines whether sufficient data is stored within the flow buffer to support efficient broadcast of data. Since the flow buffer has data beginning with superframe "3", the FLO Service Node 602 may begin providing flow data to the multiplexer 604 for broadcast beginning when the induced sleep interval expires at time "6." At time "6" the receiver device 10 may activate its broadcast receiver and receive broadcast content. At time "8" in this example the FLO Service Node 602 determines that its flow buffer is empty (or contains less than the threshold amount of data). At this point, the FLO Service Node 602 may determine that an induced monitoring period should be commenced, but delay initiation until unix time "10" in order to align the period with induced monitoring periods that may be induced on other flows. At time "10" the value "5" is included in the NextSuperframeOffset field of the OIS which is broadcast to indicate that data broadcasts will be suspended for at least five superframes. Upon receiving this NextSuperframeOffset value, receiver devices 10 may deactivate their receiver circuit and begin counting down the induced sleep interval to the activation time. FIG. 10 illustrates how in this embodiment, introduced sleep intervals may be coordinated so that they begin and/or end at a common time anchor. As a result, in this embodiment, receiver devices will periodically wake up at the same time to receive the OIS to determine whether data transmissions have recommenced.

In another embodiment, at the time the FLO Service Node 604 determines that the flow buffer is empty it may calculate and transmit another induced sleep interval value equal to five superframes, regardless of the current time. This embodiment ensures that a receiver device monitoring the flow is able to shut down its receiver circuit and conserve power as soon as data is no longer being transmitted within the flow. However, this embodiment may not be able to support synchronization of induced sleep intervals across multiple data flows, since the initiation of the induced sleep intervals may occur at any time. Thus, in this embodiment, the multiplexer 604 would receive the induced sleep interval value and that information in the OIS broadcast to receiver devices 10 at unix time "8" instead of waiting until time "10" NextSuperframeOffset induced sleep interval.

Figure 11:
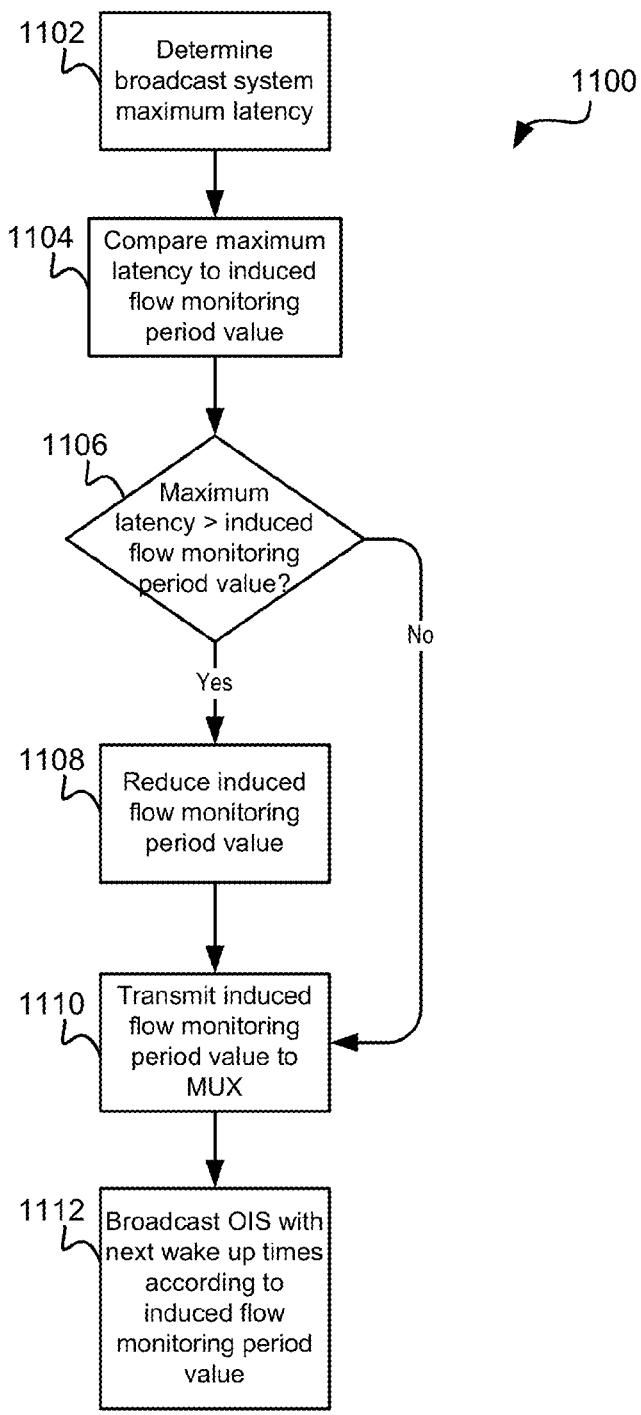
FIG. 11 is a process flow diagram of an embodiment for adjusting the induced sleep interval value based on latency of the broadcast system.

FIG. 11 is a process flow diagram 1100 of an embodiment method for determining and adjusting the induced sleep interval value based on the maximum latency of the broadcast system. The FLO Service Node 602 may determine the maximum latency period of the broadcast system in step 1102. The FLO Service Node 602 may compare the calculated induced sleep interval to the maximum latency of the broadcast system in step 1104, and determine whether the maximum latency is larger than the induced sleep interval value in determination step 1106. If the maximum latency is larger than the induced sleep interval value (i.e., determination step 1106="Yes"), FLO Service Node 602 may reduce the value of the induced sleep interval to be less than the maximum latency in step 1108, and transmit the reduced induced sleep interval to the multiplexer 604 in step 1110. The multiplexer 604 may broadcast the induced sleep interval value in an OIS field in subsequent superframes in step 1112. If the induced sleep interval is not larger than the maximum latency (i.e., determination step 1106="No"), the FLO Service Node 602 may transmit the reduced induced sleep interval value to the multiplexer 604 in step 1110. The multiplexer 604 may broadcast the induced sleep interval value in an OIS field, step 1112.

In an embodiment noted above, the FLO Service Node 602 may be configured to synchronize the induced sleep intervals of multiple data flows to enable receiver devices monitoring multiple flows to take advantage of the power savings enabled by the various embodiments. This embodiment may be accomplished by gathering statistics regarding the data rate and periodicity of data bursts of the various data flows, and using such statistics to identify induced sleep intervals which will accommodate the average data rate of multiple data flows. In so doing, a FLO Service Node may schedule induced monitoring periods periodically so that, on average, multiple flows can suspend data broadcasts simultaneously without exceeding their flow buffer capacity and enabling efficient use of broadcast bandwidth. In this embodiment, the need to initiate an induced sleep interval may not depend upon the current state of any one flow buffer, but instead upon an average of multiple flow buffers or a statistically determined data rate that will enable multiple flows to be halted simultaneously while content is cached in flow buffers. The depending upon the relative data rate of the multiple data flows, some data flows may not implement every induced sleep interval, such as when their average data rate exceeds the average all flow data rates. The implementation of this embodiment then proceeds as described above in both the broadcaster and the receiver devices.

Figure 12:
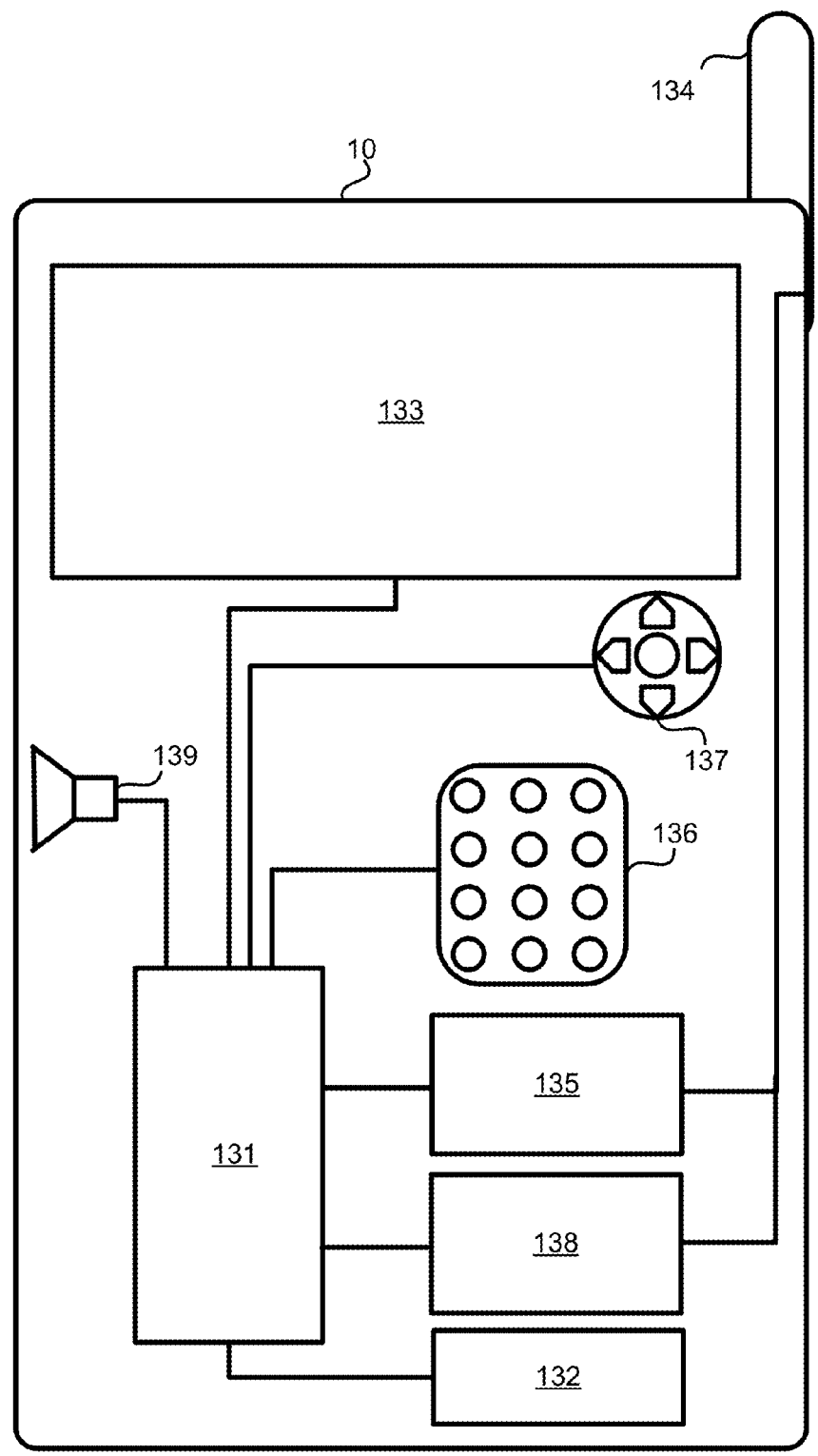
FIG. 12 is a component block diagram of a receiver device suitable for implementing the various embodiment methods.

Typical receiver devices 10 suitable for use with the various embodiments will have in common the components illustrated in FIG. 12. For example, an exemplary receiver device 10 may include a processor 131 coupled to internal memory 132, a display 133, and to a speaker 139. Additionally, the receiver device 10 may have an antenna 134 for sending and receiving electromagnetic radiation that is connected to a wireless data link and/or cellular telephone transceiver 135 coupled to the processor 131 and a mobile multimedia broadcast receiver 138 coupled to the processor 131. Receiver devices typically also include a key pad 136 or miniature keyboard and menu selection buttons or rocker switches 137 for receiving user inputs.

Figure 13:
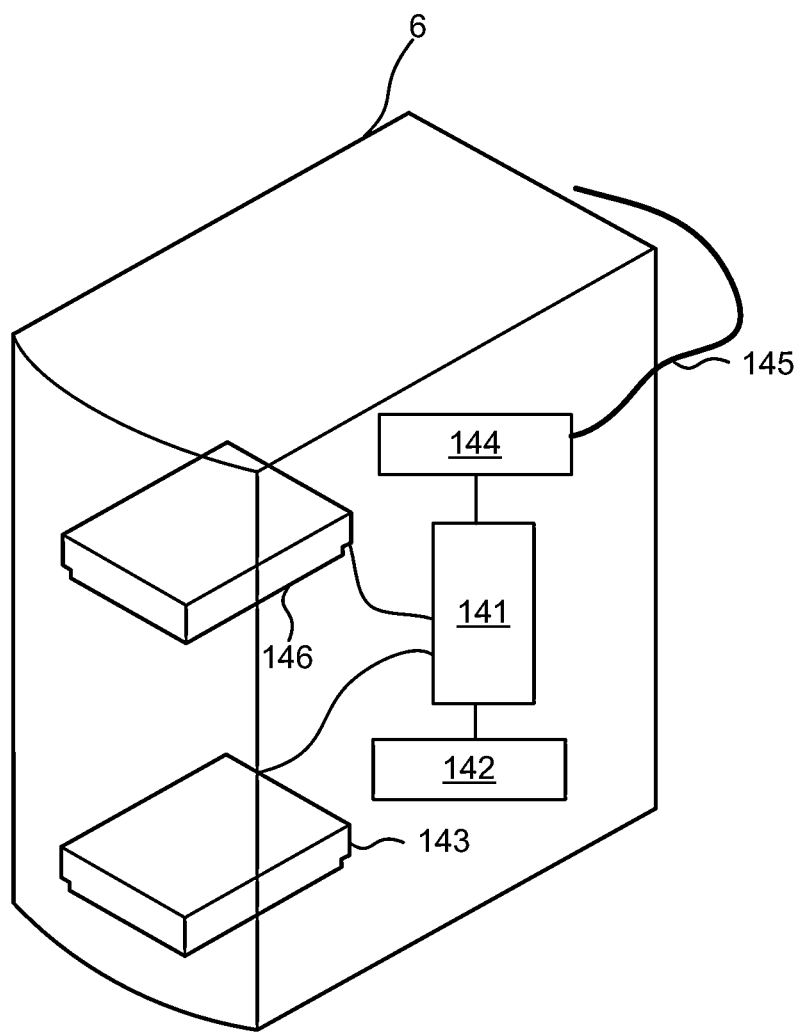
FIG. 13 is a component block diagram of a server suitable for implementing the various embodiment methods.

A number of the embodiments described above may also be implemented at the headend of a broadcast system on any of a variety of commercially available server devices, such as the server 6 illustrated in FIG. 13. Such a server 6 typically includes a processor 141 coupled to volatile memory 142 and a large capacity nonvolatile memory, such as a disk drive 143. The server 6 may also include a floppy disc drive and/or a compact disc (CD) drive 146 coupled to the processor 141. The server 6 may also include network access ports 144 coupled to the processor 141 for establishing data connections with a network 145, such as the Internet and local networks for communicating with broadcast system equipment, such as a multiplexer server.

The processors 131, 141 may be any programmable microprocessor, microcomputer or multiple processor chip or chips that can be configured by software instructions (applications) to perform a variety of functions, including the functions of the various embodiments described herein. In some receiver devices, multiple processors 131, 141 may be provided, such as one processor dedicated to wireless communication functions and one processor dedicated to running other applications. Typically, software applications may be stored in the internal memory 132, 142, 143 before they are accessed and loaded into the processor 131, 141. In some receiver devices, the processor 131, 141 may include internal memory sufficient to store the application software instructions. In some receiver devices, the secure memory may be in a separate memory chip coupled to the processor 131, 141. In many receiver devices 10 and servers 6, the internal memory 132, 142, 143 may be a volatile or nonvolatile memory, such as flash memory, or a mixture of both. For the purposes of this description, a general reference to memory refers to all memory accessible by the processor 131, 141, including internal memory 132, 142, 143, removable memory plugged into the receiver device, and memory within the processor 131, 141 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more computer-executable or processor-executable instructions or code on a tangible, non-transitory computer-readable or non-transitory processor-readable storage medium. The steps of a method or algorithm disclosed herein may be embodied in a processor-executable software module which may reside on a computer-readable storage medium. A non-transitory computer-readable storage media may be any available media that may be accessed by a computer. By way of example, and not limitation, such non-transitory computer-readable and non-transitory processor-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of tangible, non-transitory computer-readable media. Additionally, the operations of a method or algorithm may reside as one or any combination or set of codes and/or processor-executable instructions stored on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of broadcasting flow content in a mobile multimedia broadcast system, comprising:

determining when broadcast of data within a data flow should be suspended temporarily based, at least in part, upon a statistical analysis of flow content received from a content provider;

determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

broadcasting an indication of the determined duration of suspended data broadcasts;

suspending broadcast of data within the data flow for the determined duration; and storing the flow content received from the content provider in the flow buffer for the determined duration.

2. The method of claim 1, wherein determining when broadcast of data within a data flow should be suspended temporarily comprises determining when the flow buffer contains insufficient flow content data to enable efficient use of broadcast bandwidth.

3. The method of claim 1, wherein determining when broadcast of data within a data flow should be suspended temporarily comprises determining whether an amount of data stored in the flow buffer is less than a threshold amount.

4. The method of claim 1, wherein determining when broadcast of data within a data flow should be suspended temporarily is based upon a data rate of flow content received from the content provider.

5. The method of claim 1, wherein determining when broadcast of data within a data flow should be suspended temporarily comprises determining when suspending broadcasts of data within a plurality of data flows that will enable efficient use of broadcast bandwidth.

6. The method of claim 1, wherein determining when broadcast of data within a data flow should be suspended temporarily comprises:

determining whether an amount of data stored in the flow buffer is less than a threshold amount that is greater zero;

determining whether data stored in the flow buffer will exceed a threshold beyond which the data stored in the flow buffer would become stale if the broadcast of data within the data flow are suspended for the determined duration;

determining that the data flow should be suspended temporarily when it is determined that the data stored in the flow buffer will not become stale within the determined duration for suspending the broadcast of data within the data flow; and determining that the data flow should not be suspended temporarily when it is determined that the data stored in the flow buffer will become stale within the determined duration for suspending the broadcast of data within the data flow.

7. The method of claim 1, wherein determining a duration for suspending broadcast of data within the data flow comprises determining the duration based upon a predefined duration.

8. The method of claim 1, wherein suspending broadcast of the data comprises suspending broadcast of the data within the data flow for the determined duration without deactivating the data flow.

9. The method of claim 8, wherein determining a duration for suspending broadcast of data within the data flow comprises dividing a remaining capacity of the flow buffer by an average data rate of the flow content received from the content provider.

10. The method of claim 8, wherein determining a duration for suspending broadcast of data within the data flow is based upon a statistical analysis of the content flow received from the content provider.

11. The method of claim 1, wherein suspending broadcast of data within the data flow for the determined duration without deactivating the data flow comprises suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

12. The method of claim 1, wherein suspending broadcast of data within the data flow for the determined duration without deactivating the data flow comprises suspending broadcast of data within the data flow beginning at a time anchor common to a plurality of the other data flows broadcast by the mobile multimedia broadcast system so that receiver devices periodically wake up at the common time anchor.

13. The method of claim 1, wherein broadcasting an indication of the determined duration of suspended data broadcasts comprises including a value in an overhead channel of the broadcast signal indicating the determined duration.

14. The method of claim 13, wherein the mobile multimedia broadcast system is a wireless system, and the value indicating the determined direction is broadcasted as an offset field value included within the overhead information symbols (OIS) within the broadcast signal.

15. The method of claim 1, further comprising:

obtaining the indication of the determined duration of suspended data broadcasts at a receiver device;

deactivating a receiver circuit of the receiver device for the determined duration; and reactivating the receiver circuit at the end of the determined duration.

16. The method of claim 1, wherein the data flow comprises an Internet protocol data cast service.

17. A multimedia broadcast communication system, comprising:

a multimedia broadcast system comprising:

a broadcast transmission system; and a server processor in communication with the broadcast transmission system, wherein the server is configured with server-executable instructions to perform operations comprising:

determining when broadcast of data within a data flow should be suspended temporarily based, at least in part, upon a statistical analysis of flow content received from a content provider;

determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

broadcasting an indication of the determined duration of suspended data broadcasts;

suspending broadcast of data within the data flow for the determined duration; and storing the flow content received from the content provider in the flow buffer for the determined duration; and a receiver device, comprising:

a processor; and a receiver circuit coupled to the processor and configured to receive transmissions from a multimedia broadcaster, wherein the processor is configured with processor-executable instructions to perform operations comprising.

obtaining the indication of the determined duration of suspended data broadcasts with transmissions received from the multimedia broadcaster;
deactivating the receiver circuit for the determined duration; and
reactivating the receiver circuit at the end of the determined duration.

18. The multimedia broadcast communication system of claim 17, wherein the server is configured with server-executable instructions to perform operations such that determining when broadcast of data within a data flow should be suspended temporarily comprises determining when the flow buffer contains insufficient flow content data to enable efficient use of broadcast bandwidth.

19. The multimedia broadcast communication system of claim 17, wherein the server is configured with server-executable instructions to perform operations such that determining when broadcast of data within a data flow should be suspended temporarily comprises determining whether an amount of data stored in the flow buffer is less than a threshold amount.

20. The multimedia broadcast communication system of claim 17, wherein the server is configured with server-executable instructions to perform operations such that determining when broadcast of data within a data flow should be suspended temporarily is based upon a data rate of flow content received from the content provider.

21. The multimedia broadcast communication system of claim 17, wherein the server is configured with server-executable instructions to perform operations such that determining when broadcast of data within a data flow should be suspended temporarily comprises determining when suspending broadcasts of data within a plurality of data flows that will enable efficient use of broadcast bandwidth.

22. The multimedia broadcast communication system of claim 17, wherein the server is configured with server-executable instructions to perform operations such that determining when broadcast of data within a data flow should be suspended temporarily comprises:
determining whether an amount of data stored in the flow buffer is less than a threshold amount that is greater zero;
determining whether data stored in the flow buffer will exceed a threshold beyond which the data stored in the flow buffer would become stale if the broadcast of data within the data flow are suspended for the determined duration;
determining that the data flow should be suspended temporarily when it is determined that the data stored in the flow buffer will not become stale within the determined duration for suspending the broadcast of data within the data flow; and
determining that the data flow should not be suspended temporarily when it is determined that the data stored in the flow buffer will become stale within the determined duration for suspending the broadcast of data within the data flow.

23. The multimedia broadcast communication system of claim 17, wherein the server is configured with server-executable instructions to perform operations such that determining a duration for suspending broadcast of data within the data flow comprises determining the duration based upon a predefined duration.

24. The multimedia broadcast communication system of claim 17, wherein the server is configured with server-executable instructions to perform operations such that suspending broadcast of the data comprises suspending broadcast of the data within the data flow for the determined duration without deactivating the data flow.

25. The multimedia broadcast communication system of claim 24, wherein the server is configured with server-executable instructions to perform operations such that determining a duration for suspending broadcast of data within the data flow comprises dividing a remaining capacity of the flow buffer by an average data rate of the flow content received from the content provider.

26. The multimedia broadcast communication system of claim 24, wherein the server is configured with server-executable instructions to perform operations such that determining a duration for suspending broadcast of data within the data flow is based upon a statistical analysis of the content flow received from the content provider.

27. The multimedia broadcast communication system of claim 17, wherein the server is configured with server-executable instructions to perform operations such that suspending broadcast of data within the data flow for the determined duration without deactivating the data flow comprises suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

28. The multimedia broadcast communication system of claim 17, wherein the server is configured with server-executable instructions to perform operations such that suspending broadcast of data within the data flow for the determined duration without deactivating the data flow comprises suspending broadcast of data within the data flow beginning at a time anchor common to a plurality of the other data flows broadcast by the mobile multimedia broadcast system so that receiver devices periodically wake up at the common time anchor.

29. The multimedia broadcast communication system of claim 17, wherein the server is configured with server-executable instructions to perform operations such that broadcasting an indication of the determined duration of suspended data broadcasts comprises including a value in an overhead channel of the broadcast signal indicating the determined duration.

30. The multimedia broadcast communication system of claim 29, wherein the mobile multimedia broadcast system is a wireless system, and the value indicating the determined direction is broadcasted as an offset field value included within the overhead information symbols (OIS) within the broadcast signal.

31. The multimedia broadcast communication system of claim 17, wherein the server is configured with server-executable instructions such that the data flow comprises an Internet protocol data cast service.

32. A multimedia broadcast communication system, comprising:
means for determining when broadcast of data within a data flow should be suspended temporarily based, at least in part, upon a statistical analysis of flow content received from a content provider;
means for determining a duration for suspending the broadcast of data within the data flow, wherein means for determining a duration for suspending broadcast of data within the data flow comprises means for calculating a period of time for suspending broadcast of data based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

means for broadcasting an indication of the determined duration of suspended data broadcasts;

means for suspending broadcast of data within the data flow for the determined duration;

means for storing the flow content received from the content provider in the flow buffer for the determined duration;

means for obtaining the indication of the determined duration of suspended data broadcasts with transmissions received from a multimedia broadcaster;

means for deactivating the receiver circuit for the determined duration; and means for reactivating the receiver circuit at the end of the determined duration.

33. The multimedia broadcast communication system of claim 32, wherein means for determining when broadcast of data within a data flow should be suspended temporarily comprises means for determining when the flow buffer contains insufficient flow content data to enable efficient use of broadcast bandwidth.

34. The multimedia broadcast communication system of claim 32, wherein means for determining when broadcast of data within a data flow should be suspended temporarily comprises means for determining whether an amount of data stored in the flow buffer is less than a threshold amount.

35. The multimedia broadcast communication system of claim 32, wherein means for determining when broadcast of data within a data flow should be suspended temporarily comprises means for determining when broadcast of data within a data flow should be suspended temporarily based upon a data rate of flow content received from the content provider.

36. The multimedia broadcast communication system of claim 32, wherein means for determining when broadcast of data within a data flow should be suspended temporarily comprises means for determining when suspending broadcasts of data within a plurality of data flows that will enable efficient use of broadcast bandwidth.

37. The multimedia broadcast communication system of claim 32, wherein means for determining when broadcast of data within a data flow should be suspended temporarily comprises:

means for determining whether an amount of data stored in the flow buffer is less than a threshold amount that is greater zero;

means for determining whether data stored in the flow buffer will exceed a threshold beyond which the data stored in the flow buffer would become stale if the broadcast of data within the data flow are suspended for the determined duration;

means for determining that the data flow should be suspended temporarily when it is determined that the data stored in the flow buffer will not become stale within the determined duration for suspending the broadcast of data within the data flow; and means for determining that the data flow should not be suspended temporarily when it is determined that the data stored in the flow buffer will become stale within the determined duration for suspending the broadcast of data within the data flow.

38. The multimedia broadcast communication system of claim 32, wherein means for determining a duration for suspending broadcast of data within the data flow comprises means for determining the duration based upon a predefined duration.

39. The multimedia broadcast communication system of claim 32, wherein the means for suspending broadcast of the data comprises means for suspending broadcast of the data within the data flow for the determined duration without deactivating the data flow.

40. The multimedia broadcast communication system of claim 39, wherein means for determining a duration for suspending broadcast of data within the data flow comprises means for dividing a remaining capacity of the flow buffer by an average data rate of the flow content received from the content provider.

41. The multimedia broadcast communication system of claim 39, wherein means for determining a duration for suspending broadcast of data within the data flow comprises means for determining a duration for suspending broadcast of data within the data flow based upon a statistical analysis of the content flow received from the content provider.

42. The multimedia broadcast communication system of claim 32, wherein means for suspending broadcast of data within the data flow for the determined duration without deactivating the data flow comprises means for suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

43. The multimedia broadcast communication system of claim 32, wherein means for suspending broadcast of data within the data flow for the determined duration without deactivating the data flow comprises means for suspending broadcast of data within the data flow beginning at a time anchor common to a plurality of the other data flows broadcast by the mobile multimedia broadcast system so that receiver devices periodically wake up at the common time anchor.

44. The multimedia broadcast communication system of claim 32, wherein means for broadcasting an indication of the determined duration of suspended data broadcasts comprises means for including a value in an overhead channel of the broadcast signal indicating the determined duration.

45. The multimedia broadcast communication system of claim 43, wherein the means for broadcasting comprises a wireless system, and the value indicating the determined direction is broadcasted as an offset field value included within the overhead information symbols (OIS) within the broadcast signal.

46. The multimedia broadcast communication system of claim 32, wherein dataflow comprises an Internet protocol data cast service.

47. A server in communication with the broadcast transmission system, wherein the server is coupled to a broadcast transmission system and configured with server-executable instructions to perform operations in conjunction with the broadcast transmission system comprising:

determining when broadcast of data within a data flow should be suspended temporarily based, at least in part, upon a statistical analysis of flow content received from a content provider;

determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

broadcasting an indication of the determined duration of suspended data broadcasts;

suspending broadcast of data within the data flow for the determined duration; and storing the flow content received from the content provider in the flow buffer for the determined duration.

48. The server of claim 47, wherein the server is configured with server-executable instructions such that determining when broadcast of data within a data flow should be suspended temporarily comprises determining when the flow buffer contains insufficient flow content data to enable efficient use of broadcast bandwidth.

49. The server of claim 47, wherein the server is configured with server-executable instructions such that determining when broadcast of data within a data flow should be suspended temporarily comprises determining whether an amount of data stored in the flow buffer is less than a threshold amount.

50. The server of claim 47, wherein the server is configured with server-executable instructions such that determining when broadcast of data within a data flow should be suspended temporarily is based upon a data rate of flow content received from the content provider.

51. The server of claim 47, wherein the server is configured with server-executable instructions such that determining when broadcast of data within a data flow should be suspended temporarily comprises determining when suspending broadcasts of data within a plurality of data flows that will enable efficient use of broadcast bandwidth.

52. The server of claim 47, wherein the server is configured with server-executable instructions such that determining when broadcast of data within a data flow should be suspended temporarily comprises:

determining whether an amount of data stored in the flow buffer is less than a threshold amount that is greater zero;

determining whether data stored in the flow buffer will exceed a threshold beyond which the data stored in the flow buffer would become stale if the broadcast of data within the data flow are suspended for the determined duration;

determining that the data flow should be suspended temporarily when it is determined that the data stored in the flow buffer will not become stale within the determined duration for suspending the broadcast of data within the data flow; and determining that the data flow should not be suspended temporarily when it is determined that the data stored in the flow buffer will become stale within the determined duration for suspending the broadcast of data within the data flow.

53. The server of claim 47, wherein the server is configured with server-executable instructions such that determining a duration for suspending broadcast of data within the data flow comprises determining the duration based upon a predefined duration.

54. The server of claim 47, wherein the server is configured with server-executable instructions such that suspending broadcast of the data comprises suspending broadcast of the data within the data flow for the determined duration without deactivating the data flow.

55. The server of claim 54, wherein the server is configured with server-executable instructions such that determining a duration for suspending broadcast of data within the data flow comprises dividing a remaining capacity of the flow buffer by an average data rate of the flow content received from the content provider.

56. The server of claim 54, wherein the server is configured with server-executable instructions such that determining a duration for suspending broadcast of data within the data flow is based upon a statistical analysis of the content flow received from the content provider.

57. The server of claim 47, wherein the server is configured with server-executable instructions such that suspending broadcast of data within the data flow for the determined duration without deactivating the data flow comprises suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

58. The server of claim 47, wherein the server is configured with server-executable instructions such that suspending broadcast of data within the data flow for the determined duration without deactivating the data flow comprises suspending broadcast of data within the data flow beginning at a time anchor common to a plurality of the other data flows broadcast by the mobile multimedia broadcast system so that receiver devices periodically wake up at the common time anchor.

59. The server of claim 47, wherein the server is configured with server-executable instructions such that broadcasting an indication of the determined duration of suspended data broadcasts comprises including a value in an overhead channel of the broadcast signal indicating the determined duration.

60. The server of claim 59, wherein the mobile multimedia broadcast system is a wireless system, and wherein the server is configured with server-executable instructions such that the value indicating the determined direction is broadcasted as an offset field value included within the overhead information symbols (OIS) within the broadcast signal.

61. The server of claim 47, wherein the server is configured with server-executable instructions such that the flow content comprises an Internet protocol data cast service.

62. A server for use in a broadcast transmission system, comprising:

means for determining when broadcast of data within a data flow should be suspended temporarily based, at least in part, upon a statistical analysis of flow content received from a content provider;

means for determining a duration for suspending the broadcast of data within the data flow, wherein means for determining the duration for suspending comprises means for calculating a period of time for suspending broadcast of data within the data flow based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

means for broadcasting an indication of the determined duration of suspended data broadcasts;

means for suspending broadcast of data within the data flow for the determined duration; and means for storing the flow content received from the content provider in the flow buffer for the determined duration.

63. The server of claim 62, wherein means for determining when broadcast of data within a data flow should be suspended temporarily comprises means for determining when the flow buffer contains insufficient flow content data to enable efficient use of broadcast bandwidth.

64. The server of claim 62, wherein means for determining when broadcast of data within a data flow should be suspended temporarily comprises means for determining whether an amount of data stored in the flow buffer is less than a threshold amount.

65. The server of claim 62, wherein means for determining when broadcast of data within a data flow should be suspended temporarily comprises means for determining when broadcast of data within a data flow should be suspended temporarily based upon a data rate of flow content received from the content provider.

66. The server of claim 62, wherein means for determining when broadcast of data within a data flow should be suspended temporarily comprises means for determining when suspending broadcasts of data within a plurality of data flows that will enable efficient use of broadcast bandwidth.

67. The server of claim 62, wherein means for determining when broadcast of data within a data flow should be suspended temporarily comprises:

means for determining whether an amount of data stored in the flow buffer is less than a threshold amount that is greater zero;

means for determining whether data stored in the flow buffer will exceed a threshold beyond which the data stored in the flow buffer would become stale if the broadcast of data within the data flow are suspended for the determined duration;

means for determining that the data flow should be suspended temporarily when it is determined that the data stored in the flow buffer will not become stale within the determined duration for suspending the broadcast of data within the data flow; and means for determining that the data flow should not be suspended temporarily when it is determined that the data stored in the flow buffer will become stale within the determined duration for suspending the broadcast of data within the data flow.

68. The server of claim 62, wherein means for determining a duration for suspending broadcast of data within the data flow comprises means for determining the duration based upon a predefined duration.

69. The server of claim 62, wherein means for suspending broadcast of the data comprises means for suspending broadcast of the data within the data flow for the determined duration without deactivating the data flow.

70. The server of claim 69, wherein means for determining a duration for suspending broadcast of data within the data flow comprises means for dividing a remaining capacity of the flow buffer by an average data rate of the flow content received from the content provider.

71. The server of claim 69, wherein means for determining a duration for suspending broadcast of data within the data flow comprises means for determining a duration for suspending broadcast of data within the data flow based upon a statistical analysis of the content flow received from the content provider.

72. The server of claim 62, wherein means for suspending broadcast of data within the data flow for the determined duration without deactivating the data flow comprises means for suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

73. The server of claim 62, wherein means for suspending broadcast of data within the data flow for the determined duration without deactivating the data flow comprises means for suspending broadcast of data within the data flow beginning at a time anchor common to a plurality of the other data flows broadcast by the mobile multimedia broadcast system so that receiver devices periodically wake up at the common time anchor.

74. The server of claim 62, wherein means for broadcasting an indication of the determined duration of suspended data broadcasts comprises means for including a value in an overhead channel of the broadcast signal indicating the determined duration.

75. The server of claim 74, wherein the mobile multimedia broadcast system is a wireless system, and wherein the value indicating the determined direction is broadcasted as an offset field value included within the overhead information symbols (OIS) within the broadcast signal.

76. The server of claim 62, wherein the flow content comprises an Internet protocol data cast service.

77. A non-transitory computer-readable storage medium having stored thereon computer-executable instructions configured to cause a server within a broadcast transmission system to perform operations in conjunction with the broadcast transmission system comprising:

determining when broadcast of data within a data flow should be suspended temporarily based, at least in part, upon a statistical analysis of flow content received from a content provider;

determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received from a source of the data, including synchronizing induced sleep intervals of multiple data flows, by at least in part, gathering statistics regarding data rate and periodicity of data bursts of the multiple data flows, and using the statistics to identify induced sleep intervals that will accommodate an average data rate of the multiple data flows;

broadcasting an indication of the determined duration of suspended data broadcasts;

suspending broadcast of data within the data flow for the determined duration; and storing the flow content received from the content provider in the flow buffer for the determined duration.

78. The non-transitory computer-readable storage medium of claim 77, wherein the stored computer-executable instructions are configured to cause a server to perform operations such that determining when broadcast of data within a data flow should be suspended temporarily comprises determining when the flow buffer contains insufficient flow content data to enable efficient use of broadcast bandwidth.

79. The non-transitory computer-readable storage medium of claim 77, wherein the stored computer-executable instructions are configured to cause a server to perform operations such that determining when broadcast of data within a data flow should be suspended temporarily comprises determining whether an amount of data stored in the flow buffer is less than a threshold amount.

80. The non-transitory computer-readable storage medium of claim 77, wherein the stored computer-executable instructions are configured to cause a server to perform operations such that determining when broadcast of data within a data flow should be suspended temporarily is based upon a data rate of flow content received from the content provider.

81. The non-transitory computer-readable storage medium of claim 77, wherein the stored computer-executable instructions are configured to cause a server to perform operations such that determining when broadcast of data within a data flow should be suspended temporarily comprises determining when suspending broadcasts of data within a plurality of data flows that will enable efficient use of broadcast bandwidth.

82. The non-transitory computer-readable storage medium of claim 77, wherein the stored computer-executable instructions are configured to cause a server to perform operations such that determining when broadcast of data within a data flow should be suspended temporarily comprises:
　determining whether an amount of data stored in the flow buffer is less than a threshold amount that is greater zero;
　determining whether data stored in the flow buffer will exceed a threshold beyond which the data stored in the flow buffer would become stale if the broadcast of data within the data flow are suspended for the determined duration;
　determining that the data flow should be suspended temporarily when it is determined that the data stored in the flow buffer will not become stale within the determined duration for suspending the broadcast of data within the data flow; and
　determining that the data flow should not be suspended temporarily when it is determined that the data stored in the flow buffer will become stale within the determined duration for suspending the broadcast of data within the data flow.

83. The non-transitory computer-readable storage medium of claim 77, wherein the stored computer-executable instructions are configured to cause a server to perform operations such that determining a duration for suspending broadcast of data within the data flow comprises determining the duration based upon a predefined duration.

84. The non-transitory computer-readable storage medium of claim 77, wherein the stored computer-executable instructions are configured to cause a server to perform operations such that suspending broadcast of the data comprises suspending broadcast of the data within the data flow for the determined duration without deactivating the data flow.

85. The non-transitory computer-readable storage medium of claim 84, wherein the stored computer-executable instructions are configured to cause a server to perform operations such that determining a duration for suspending broadcast of data within the data flow comprises dividing a remaining capacity of the flow buffer by an average data rate of the flow content received from the content provider.

86. The non-transitory computer-readable storage medium of claim 84, wherein the stored computer-executable instructions are configured to cause a server to perform operations such that determining a duration for suspending broadcast of data within the data flow is based upon a statistical analysis of the content flow received from the content provider.

87. The non-transitory computer-readable storage medium of claim 77, wherein the stored computer-executable instructions are configured to cause a server to perform operations such that suspending broadcast of data within the data flow for the determined duration without deactivating the data flow comprises suspending broadcast of data within the data flow beginning at a time selected so that the determined duration of suspended data broadcasts at a common time anchor, to a plurality of the other data flows broadcast by the mobile multimedia broadcast system so that receiver devices periodically wake up at the common time anchor.

88. The non-transitory computer-readable storage medium of claim 77, wherein the stored computer-executable instructions are configured to cause a server to perform operations such that suspending broadcast of data within the data flow for the determined duration without deactivating the data flow comprises suspending broadcast of data within the data flow beginning at a time anchor common to a plurality of the other data flows broadcast by the mobile multimedia broadcast system so that receiver devices periodically wake up at the common time anchor.

89. The non-transitory computer-readable storage medium of claim 77, wherein the stored computer-executable instructions are configured to cause a server to perform operations such that broadcasting an indication of the determined duration of suspended data broadcasts comprises including a value in an overhead channel of the broadcast signal indicating the determined duration.

90. The non-transitory computer-readable storage medium of claim 89, wherein the mobile multimedia broadcast system is a wireless system, and wherein the stored computer-executable instructions are configured to cause a server to perform operations such that the value indicating the determined direction is broadcasted as an offset field value included within the overhead information symbols (OIS) within the broadcast signal.

91. The non-transitory computer-readable storage medium of claim 77, wherein the stored computer-executable instructions are configured to cause a server to perform operations such that the flow content comprises an Internet protocol data cast service.

92. A method for broadcasting and receiving flow content in a multimedia communication system, comprising:
　determining when broadcast of data within a data flow should be suspended temporarily based, at least in part, upon a statistical analysis of flow content received from a content provider;
　determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received data from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;
　broadcasting an indication of the determined duration of suspended data broadcasts;
　suspending broadcast of data within the data flow for the determined duration;
　storing the flow content received from the content provider in the flow buffer for the determined duration;

obtaining the indication of the determined duration of suspended data broadcasts with transmissions received from a multimedia broadcaster;

deactivating the receiver circuit for the determined duration; and means for reactivating the receiver circuit at the end of the determined duration.

93. A non-transitory computer-readable storage medium having stored thereon computer-executable instructions configured to cause a server within a multimedia communication system to perform operations in conjunction with the broadcast transmission system comprising:

determining when broadcast of data within a data flow should be suspended temporarily based, at least in part, upon a statistical analysis of flow content received from a content provider;

determining a duration for suspending the broadcast of data within the data flow, wherein determining a duration for suspending broadcast of data within the data flow comprises calculating a period of time for suspending broadcast of data based upon an amount of data stored in a flow buffer and a rate at which data is received from a source of the data, including synchronizing induced sleep intervals of multiple data flows by, at least in part, gathering statistics regarding data rate and periodicity of data bursts of the multiple data flows, and using the statistics to identify induced sleep intervals that will accommodate an average data rate of the multiple data flows;

broadcasting an indication of the determined duration of suspended data broadcasts;

suspending broadcast of data within the data flow for the determined duration;

storing the flow content received from the content provider in a flow buffer for the determined duration;

obtaining the indication of the determined duration of suspended data broadcasts with transmissions received from a multimedia broadcaster;

deactivating the receiver circuit for the determined duration; and means for reactivating the receiver circuit at the end of the determined duration.

* * * * *